United States Patent
Liu et al.

(10) Patent No.: US 12,389,308 B2
(45) Date of Patent: Aug. 12, 2025

(54) ACCESS METHOD AND APPARATUS, AND COMMUNICATION SYSTEM

(71) Applicant: HUAWEI TECHNOLOGIES CO., LTD., Guangdong (CN)

(72) Inventors: Hang Liu, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 401 days.

(21) Appl. No.: 17/975,446

(22) Filed: Oct. 27, 2022

(65) Prior Publication Data
US 2023/0046833 A1 Feb. 16, 2023

Related U.S. Application Data

(63) Continuation of application No. PCT/CN2020/087888, filed on Apr. 29, 2020.

(51) Int. Cl.
H04W 48/10 (2009.01)

(52) U.S. Cl.
CPC ................ *H04W 48/10* (2013.01)

(58) Field of Classification Search
None
See application file for complete search history.

(56) References Cited

U.S. PATENT DOCUMENTS

| | | | |
|---|---|---|---|
| 10,154,513 B2 * | 12/2018 | Cheng | H04W 72/542 |
| 2009/0217119 A1 * | 8/2009 | Zhang | H04L 1/1812 |
| | | | 714/748 |
| 2013/0142152 A1 | 6/2013 | Park et al. | |
| 2014/0192767 A1 * | 7/2014 | Au | H04W 72/23 |
| | | | 370/329 |
| 2018/0368181 A1 | 12/2018 | Lee et al. | |
| 2020/0077392 A1 * | 3/2020 | Deng | H04W 48/12 |

FOREIGN PATENT DOCUMENTS

| | | |
|---|---|---|
| CN | 104703224 A | 6/2015 |
| CN | 107466084 A | 12/2017 |
| CN | 107872884 A | 4/2018 |
| CN | 107734552 B | 6/2022 |

(Continued)

OTHER PUBLICATIONS

Office Action in Japanese Appln. No. 2022-565980, mailed on Jul. 9, 2024, 5 pages (with English translation).

(Continued)

*Primary Examiner* — Hong S Cho
(74) *Attorney, Agent, or Firm* — Fish & Richardson P.C.

(57) ABSTRACT

An access method and apparatus, and a communication system is provided One example method includes: sending resource configuration information, where the resource configuration information configures a first time-frequency resource used for access of a plurality of terminals; and receiving access information from at least one of the plurality of terminals on the first time-frequency resource, where the access information of the terminal includes at least one of first identity information or status information of the terminal, the first identity information identifies the terminal, and the status information indicates a status of the terminal.

20 Claims, 4 Drawing Sheets

(56) References Cited

FOREIGN PATENT DOCUMENTS

| | | |
|---|---|---|
| JP | 2006033541 A | 2/2006 |
| JP | 2020043470 A | 3/2020 |
| WO | 2017006608 A1 | 1/2017 |
| WO | 2019191966 A1 | 10/2019 |
| WO | 2020047806 A1 | 3/2020 |
| WO | 2020068947 A1 | 4/2020 |

OTHER PUBLICATIONS

Lenovo et al., "UL transmission in preconfigured resources for NBIoT," 3GPP TSG RAN WG1 Meeting #99, R1-1912320, Reno, USA, Nov. 18-22, 2019, 4 pages.
Extended European Search Report in European Appln No. 20933679.1, dated Apr. 18, 2023, 9 pages.
International Search Report and Written Opinion in International Appln. No. PCT/CN2020/087888, mailed on Jan. 14, 2021, 17 pages (with English translation).
Office Action in Japanese Appln. No. 2022-565980, mailed on Oct. 10, 2023, 6 pages (with English translation).

\* cited by examiner

ACCESS METHOD AND APPARATUS, AND COMMUNICATION SYSTEM

CROSS-REFERENCE TO RELATED APPLICATIONS

This application is a continuation of International Application No. PCT/CN2020/087888, filed on Apr. 29, 2020. The disclosure of which is hereby incorporated by reference in its entirety.

TECHNICAL FIELD

This application relates to the field of communication technologies, and in particular, to short-range communication. More specifically, this application relates to an access method and apparatus, and a communication system in the field of communication technologies.

BACKGROUND

With people's increasing requirements for personalized driving experience, an intelligent cockpit service plays an increasingly important role in people's driving process. An intelligent cockpit usually includes a plurality of devices such as a cockpit domain controller (cockpit domain controller, CDC), a vehicle-mounted speaker, a vehicle-mounted microphone, a vehicle-mounted display, an intelligent terminal, and another portable device. The CDC establishes connections to various devices wiredly or wirelessly, and communicates with these devices, to provide people with richer entertainment, audio, video, and office experience.

In an existing wireless communication system, a plurality of terminals randomly reach, and sequentially initiate random access, for example, contention-based random access, on limited and fixed time-frequency resources, to establish a connection to a network device.

However, when a vehicle with an intelligent cockpit is powered on, if vehicle-mounted terminals in the cockpit all initiate contention-based random access on the foregoing limited and fixed time-frequency resources in a short period of time, severe resource collision occurs. Consequently, batch access of the vehicle-mounted terminals cannot be implemented.

SUMMARY

Embodiments of this application provide an access method and apparatus, and a communication system, to support batch access of terminals.

According to a first aspect, an embodiment of this application provides an access method. The method may be applied to a communication system, and the communication system includes a network control apparatus and a plurality of terminals. The method includes: The network control apparatus sends resource configuration information, where the resource configuration information is used to configure a first time-frequency resource used by the plurality of terminals to access a network; at least one of the plurality of terminals sends access information of each of the at least one terminal to the network control apparatus on the first time-frequency resource, where the access information of the terminal includes at least one of first identity information or status information, the first identity information identifies the terminal, and the status information indicates a status of the terminal; and the network control apparatus receives the access information of each of the at least one terminal on the first time-frequency resource. Specifically, the foregoing "access" is initial access.

Optionally, the network control apparatus and the plurality of terminals each may be in a plurality of forms. This is not limited in this embodiment of this application.

In a possible implementation, the network control apparatus may be a CDC in a cabin, the plurality of terminals may be a plurality of vehicle-mounted terminals in the cabin, and a vehicle manufacturer integrates the CDC and the plurality of vehicle-mounted terminals into a vehicle in which the cabin is located.

It should be noted that before the network control apparatus sends the resource configuration information, the plurality of terminals are in a non-connected state. In other words, none of the plurality of terminals accesses the network control apparatus or establishes a connection to the network control apparatus.

It should be further noted that the non-connected state in this embodiment of this application may include an idle state or a deactivated state.

In other words, the status of the terminal may include a connected state and the non-connected state, and the non-connected state may include the idle state or the deactivated state.

Optionally, before the network control apparatus sends the resource configuration information, the network control apparatus needs to first determine the first time-frequency resource.

In a possible implementation, the first time-frequency resource is an available time-frequency resource in a communication domain in which the network control apparatus is located. Compared with a limited and fixed time-frequency resource preconfigured in an existing random access manner, the available time-frequency resource can provide more sufficient resources to meet group access of a plurality of terminals.

For example, the first time-frequency resource may include all available time-frequency resources in the communication domain in which the network control apparatus is located.

It should be noted that all the available time-frequency resources in this embodiment of this application may be referred to as all time-frequency resources that may be used for initial access. Further, all the time-frequency resources occupy at least one time domain resource unit (or a first time domain length) and at least one frequency domain resource unit (or a first frequency domain bandwidth). Because there is no vehicle-mounted device to access when the vehicle is just powered on, all the available time-frequency resources may be used as access resources.

In a possible implementation, after the plurality of terminals complete initial access on all the time-frequency resources used for initial access, the network control apparatus may send a system broadcast message used to indicate that initial access is completed. Correspondingly, a subsequent terminal having an access requirement performs, according to the existing random access method, random access on the preconfigured limited time-frequency resource used for random access.

It should be further noted that all the available time-frequency resources or all the time-frequency resources used for initial access do not include a time-frequency resource of a symbol (for example, a symbol carrying a pilot signal, a synchronization signal, a control signal, or a broadcast signal) that is available in the communication domain and that is used to carry system control plane overheads.

In other words, all the available time-frequency resources or all the time-frequency resources used for initial access do not include a time-frequency resource used for control information or a control signal. The control information herein may include control signaling used for scheduling data, such as broadcast channel information and data feedback information. The control signal herein may include at least one of a synchronization signal, an access channel signal, a channel sounding reference signal (sounding reference signal, SRS), a demodulation reference signal (demodulation reference signal, DMRS), or the like.

In the access method provided in this embodiment of this application, in a scenario of group access or batch access, when the vehicle is just powered on, there is no terminal to access in the communication domain in which the network control apparatus is located. Therefore, the network control apparatus can calculate or determine all the available time-frequency resources in the current communication domain, and allocate all the time-frequency resources to these terminals for group access or batch access. This can meet a requirement of group access or batch access and reduce a probability of a resource conflict generated during access of the terminals.

Optionally, the network control apparatus may determine the first time-frequency resource in a plurality of manners. This is not limited in this embodiment of this application.

In a possible implementation, a case in which the network control apparatus and the plurality of terminals belong to a first communication domain is used as an example. The network control apparatus may receive a system broadcast message from a second network control apparatus in a second communication domain, where the system broadcast message indicates all time-frequency resources occupied by the second communication domain. The network control apparatus may determine the first time-frequency resource based on all the time-frequency resources occupied by the second communication domain, where all the time-frequency resources occupied by the second communication domain are different from the first time-frequency resource.

Optionally, the first communication domain and the second communication domain may belong to a same cabin or different cabins. This is not limited in this embodiment of this application.

It should be noted that a manner in which the network control apparatus determines the first time-frequency resource is described above by using only an example in which the network control apparatus determines the first time-frequency resource based on all the time-frequency resources occupied by the second communication domain. However, this embodiment of this application is not limited thereto.

Optionally, the network control apparatus may determine the first time-frequency resource based on all time-frequency resources occupied by a plurality of communication domains. The plurality of communication domains include the second communication domain. This is not limited in this embodiment of this application.

In another possible implementation, the network control apparatus may obtain the first time-frequency resource by using a higher-layer network device. The higher-layer network device can calculate all available time-frequency resources in a communication domain in which each network control apparatus is located, and allocate all the time-frequency resources to each network control apparatus. Optionally, the network control apparatus receives indication information from another network device, where the indication information indicates the first time-frequency resource.

Optionally, the network control apparatus may send the resource configuration information in a plurality of manners. This is not limited in this embodiment of this application.

In a first possible implementation, the network control apparatus may send the resource configuration information to each of the plurality of terminals.

In a second possible implementation, the network control apparatus may send a multicast message, where the multicast message includes the resource configuration information and a multicast address.

It should be noted that the multicast address is an address for a group of terminals, and a message sent for the address may be received by the group of terminals.

Optionally, the multicast message may further include terminal quantity information, and the terminal quantity information indicates a quantity of terminals corresponding to the multicast address.

In a third possible implementation, the network control apparatus may send a system broadcast message, where the system broadcast message includes the resource configuration information.

According to the access method provided in this embodiment of this application, the network control apparatus uses the multicast message or the system broadcast message to carry the resource configuration information. This can reduce a transmission delay, and improve access efficiency.

Optionally, that at least one of the plurality of terminals sends access information of each of the at least one terminal to the network control apparatus on the first time-frequency resource may include: A first terminal sends access information of the first terminal to the network control apparatus on the first time-frequency resource; and correspondingly the network control apparatus receives the access information of the first terminal on the first time-frequency resource.

It should be noted that the first terminal is any one of the at least one terminal, and a process in which another terminal in the at least one terminal performs S220 is similar to a process in which the first terminal performs S220. To avoid repetition, details are not described herein again.

Optionally, the access information may be carried in an access message, where the access message is obtained by performing modulation and coding on the access information by using predefined modulation and coding information, and the modulation and coding information includes at least one of a modulation and coding scheme, a channel coding scheme, and a bit rate.

Correspondingly, the network control apparatus may decode the access message based on the preconfigured modulation and coding information, to obtain the access information.

Optionally, the network control apparatus and the first terminal may obtain the modulation and coding information in a plurality of manners. This is not limited in this embodiment of this application.

In a first possible implementation, the modulation and coding information may be predefined in a communication protocol, and the first terminal and the network control apparatus may determine the modulation and coding information based on the communication protocol.

In a second possible implementation, the network control apparatus may send first access configuration information to the first terminal, where the first access configuration information is used to configure the modulation and coding information. Correspondingly, the first terminal receives the first access configuration information from the network control apparatus, and determines the modulation and coding information based on the first access configuration information. Specifically, the first access configuration information may be sent to the first terminal in advance, or sent to the first terminal together with the resource configuration information.

Optionally, the resource configuration information and the first access configuration information may be carried in a same message, or may be carried in different messages. This is not limited in this embodiment of this application.

In a third possible implementation, the first terminal and the network control apparatus may agree on the modulation and coding information in advance.

Optionally, the access information of the first terminal may include at least one of the first identity information or the status information. This is not limited in this embodiment of this application.

It should be noted that the first identity information may be understood as information that can uniquely identify the identity of the first terminal in the communication domain in which the first terminal is located.

Optionally, the identity information (for example, the first identity information) of the terminal in this embodiment of this application may include at least one of the following items: a device identifier, a media access control (media access control, MAC) address, a soft address, and a short address.

Optionally, the identity information (for example, the first identity information) of the terminal in this embodiment of this application may include at least one field. The network control apparatus and the first terminal may define meanings of different fields in a plurality of manners. This is not limited in this embodiment of this application.

In a possible implementation, the identity information may include a first field, where the first field indicates a device type, and/or the identity information may include a second field, where the second field indicates a device function, and/or the identity information may include a third field, where the third field indicates a device number.

It should be noted that the status information may be understood as information that can indicate a current status of the first terminal.

Optionally, the first terminal may include a first state or a second state.

For example, the first state may be a "normal state", and the second state may be an "abnormal state".

Optionally, when the status information indicates that the status of the first terminal is the "abnormal state", the status information may further include exception indication information, and the exception indication information indicates an exception cause of the first terminal.

Optionally, the status information may indicate the status of the first terminal in a plurality of manners. This is not limited in this embodiment of this application.

In a possible implementation, the status information may include at least one bit, and the status information may indicate the current status of the first terminal by using the at least one bit.

In another possible implementation, the status information may include the exception indication information, and the exception indication information indicates that the status of the first terminal is the "abnormal state" and indicates the exception cause.

Optionally, the at least one terminal may include some or all of the plurality of terminals. This is not limited in this embodiment of this application.

It should be noted that, because some terminals may be in an abnormal state after being powered on, for example, may encounter a device fault, a line fault, or a network fault, the network control apparatus may agree with the plurality of terminals in advance that only a terminal in a normal state reports access information to the network control apparatus, and a terminal in an abnormal state does not need to report access information. In this case, the at least one terminal includes some terminals that are in the plurality of terminals and that are in a normal state.

Optionally, the first terminal may send the access information of the first terminal to the network control apparatus on the first time-frequency resource in a plurality of manners. This is not limited in this embodiment of this application.

In a first possible implementation, the first terminal may send the access information of the first terminal to the network control apparatus on the first time-frequency resource in the contention-based resource manner.

Because the first time-frequency resource indicates all the available time-frequency resources in the communication domain in which the network control apparatus is located, a resource size of the first time-frequency resource is larger than a resource size of the preconfigured limited time-frequency resource used for random access in the existing contention-based random access method. This can reduce a probability of a resource conflict generated during access of a plurality of terminals.

In a second possible implementation, the first terminal may determine, from the first time-frequency resource, a second time-frequency resource corresponding to each terminal. The first terminal sends the access information of the first terminal to the network control apparatus on the second time-frequency resource corresponding to the first terminal.

It should be noted that the second time-frequency resource corresponding to the first terminal in this embodiment of this application may be understood as a time-frequency resource used by the first terminal to report the access information.

In other words, the first time-frequency resource may include at least one second time-frequency resource, and the at least one second time-frequency resource is in a one-to-one correspondence with the at least one terminal.

It should be further noted that second time-frequency resources corresponding to all of the plurality of terminals are orthogonal to each other. In other words, second time-frequency resources corresponding to any two terminals do not overlap each other in time-frequency or frequency domain.

According to the access method provided in this embodiment of this application, the second time-frequency resources corresponding to all of the plurality of terminals are orthogonal to each other, so that a probability of a resource conflict generated during access of the plurality of terminals can be avoided.

Optionally, the second time-frequency resource corresponding to the first terminal may be determined by using at least one of the following items: second identity information of the first terminal, a resource size of the first time-frequency resource, a resource size of the second time-frequency resource corresponding to the first terminal, or at least one preconfigured value.

It should be noted that the second identity information of the first terminal may be understood as information that can uniquely identify the identity of the terminal in the communication domain in which the first terminal is located.

Optionally, the second identity information may include at least one of the following items: a device identifier, a MAC address, a soft address, or a short address.

Optionally, the first identity information and the second identity information of the first terminal may be the same or may be different. This is not limited in this embodiment of this application.

For example, the first identity information may include a MAC address, and the second identity information may include a soft address.

For another example, the first identity information may include a MAC address and a device identifier, and the second identity information may include a soft address.

Optionally, the first terminal may determine, in a plurality of manners, the resource size of the second time-frequency resource corresponding to the first terminal. This is not limited in this embodiment of this application.

In a possible implementation, the first terminal may determine, based on the modulation and coding information and a size of the access information, the resource size of the second time-frequency resource corresponding to the first terminal.

In a second possible implementation, before S220, the first terminal may receive second access configuration information from the network control apparatus, where the second access configuration information is used to configure the resource size of the second time-frequency resource corresponding to the first terminal.

Optionally, the resource configuration information and the second access configuration information may be carried in a same message, or may be carried in different messages. This is not limited in this embodiment of this application.

In a third possible implementation, the first terminal and the network control apparatus may agree in advance on the resource size of the second time-frequency resource corresponding to the first terminal. In other words, the resource size of the second time-frequency resource is preconfigured or predefined.

It should be noted that the at least one preconfigured value may be a preconfigured value used to determine a second time-frequency resource corresponding to each terminal.

In a possible implementation, the at least one value may include a first value, and the first value indicates a quantity of terminals.

For example, the quantity of terminals may indicate a quantity of terminals in a group corresponding to a multicast address.

For another example, the quantity of terminals may be a quantity of terminals that make an incoming call by the network control apparatus based on the resource configuration information.

Optionally, the at least one value may be preconfigured for the terminals in a plurality of manners. This is not limited in this embodiment of this application.

In a first possible implementation, the at least one value may be preconfigured in a communication protocol, and the first terminal may obtain the at least one value based on the communication protocol.

In a second possible implementation, before S220, the first terminal may receive third access configuration information from the network control apparatus, where the third access configuration information is used to configure the at least one value.

Optionally, the resource configuration information and the third access configuration information may be carried in a same message, or may be carried in different messages. This is not limited in this embodiment of this application.

In a third possible implementation, the first terminal and the network control apparatus may agree on the at least one value in advance.

Optionally, the first terminal may determine, from the first time-frequency resource in a plurality of manners, the second time-frequency resource corresponding to the first terminal. This is not limited in this embodiment of this application.

In a first possible implementation, the first terminal may determine, based on the resource size of the first time-frequency resource and the resource size of the second time-frequency resource corresponding to the first terminal, the second time-frequency resource corresponding to the first terminal.

It should be noted that, because the network control apparatus and the first terminal may be produced by a same vehicle manufacturer, the vehicle manufacturer may preconfigure, for the network control apparatus, related information (for example, the second identity information of the first terminal, the resource size of the second time-frequency resource corresponding to the first terminal, and the at least one value) used to determine the second time-frequency resource corresponding to the first terminal and a calculation rule of the second time-frequency resource corresponding to the first terminal. Therefore, the network control apparatus does not need to perform additional signaling interaction with the first terminal to obtain the related information required for determining the second time-frequency resource corresponding to the first terminal. This can reduce signaling overheads, and reduce an access delay.

Optionally, the network control apparatus and the first terminal may agree on a division rule and a number rule of resource blocks in the first time-frequency resource in advance, and the network control apparatus and the first terminal may determine, according to the number rule and the division rule, a number of each resource block and a resource size of each resource block in the first time-frequency resource.

In other words, the network control apparatus and the first terminal can determine, by using a similar method, the second time-frequency resource corresponding to the first terminal.

In a second possible implementation, the first terminal may determine, based on the resource size of the first time-frequency resource, the resource size of the second time-frequency resource corresponding to the first terminal, and the second identity information of the first terminal, the second time-frequency resource corresponding to the first terminal.

In a third possible implementation, the first terminal may determine, based on the second identity information of the first terminal and the first value, the second time-frequency resource corresponding to the first terminal, where the at least one value includes the first value.

Optionally, at least two terminals in the plurality of terminals may have different attributes. The network control apparatus may configure different sub-resources for terminals with different attributes by using the resource configuration information. The first time-frequency resource includes the sub-resources corresponding to the terminals with different attributes.

Optionally, the attribute may include at least one of a device type, a multicast address, or a device priority.

In a possible implementation, for example, the plurality of terminals include a first terminal with a first attribute and a second terminal with a second attribute, the first terminal corresponds to a first time-frequency sub-resource in the first time-frequency resource, and the second terminal corresponds to a second time-frequency sub-resource in the first time-frequency resource. That the first terminal sends access information of the first terminal to the network control apparatus on the first time-frequency resource may include: The first terminal sends the access information of the first terminal to the network control apparatus on the first time-frequency sub-resource; and correspondingly, the network control apparatus receives the access information of the first terminal on the first time-frequency sub-resource.

It should be noted that at least one of time domain resources or frequency domain resources of time-frequency sub-resources corresponding to terminals with different attributes is different.

In other words, the first time-frequency sub-resource does not overlap at least one of time domain resources or frequency domain resources of the second time-frequency sub-resource.

According to the access method provided in this embodiment of this application, the network control apparatus configures the different time-frequency sub-resources for the terminals with different attributes, so that the terminals with the different attributes perform access on the time-frequency sub-resources corresponding to the attributes to which the terminals belong. This can reduce a probability of a resource conflict generated during access between the terminals with different attributes.

It should be noted that for a method in which the first terminal determines, on the first time-frequency sub-resource, the second time-frequency resource corresponding to the first terminal, refer to the foregoing method for determining, on the first time-frequency resource, the second time-frequency resource corresponding to the first terminal. A difference lies only in that: The resource size of the first time-frequency resource is replaced with a resource size of the first time-frequency sub-resource. To avoid repetition, details are not described herein again.

Optionally, the method may further include: The network control apparatus determines that at least one first target terminal in the at least one terminal successfully performs access.

Optionally, the network control apparatus may determine, in a plurality of manners, that the at least one first target terminal successfully performs access. This is not limited in this embodiment of this application.

In a first possible implementation, the network control apparatus may determine, based on access information of each of the at least one terminal, that the at least one first target terminal successfully performs access.

In other words, the network control apparatus successfully obtains the access information of each of the at least one terminal through parsing.

In a second possible implementation, the network control apparatus may determine, based on access information of each of the at least one first target terminal, that the at least one first target terminal successfully performs access.

Optionally, the method further includes: The network control apparatus sends indication information to the at least one first target terminal, where the indication information indicates that the at least one first target terminal successfully performs access. Correspondingly, each of the at least one first target terminal receives the indication information from the network control apparatus, and determines, based on the indication information, that access succeeds.

Optionally, the network control apparatus may send the indication information to the at least one first target terminal in a plurality of manners. This is not limited in this embodiment of this application.

In a possible implementation, the network control apparatus may send the indication information to each of the at least one first target terminal.

In another possible implementation, the network control apparatus may send a system broadcast message, where the system broadcast message includes the indication information.

Optionally, the indication information may indicate, in a plurality of manners, that the at least one first target terminal successfully performs access. This is not limited in this embodiment of this application.

In a first possible implementation, the indication information may include third identity information of each of the at least one first target terminal, and the third identity information of each first target terminal indicates the first target terminal.

It should be noted that the third identity information may include at least one of the following items: a device identifier, a MAC address, a soft address, or a short address of the first target terminal.

Optionally, the third identity information of the first target terminal may be the same as or different from the first identity information reported when access is requested. This is not limited in this embodiment of this application.

In a second possible implementation, the indication information may include third identity information of each of at least one second target terminal, the third identity information of each second target terminal indicates the second target terminal, and the at least one second target terminal is a terminal that fails to perform access in the at least one terminal.

Optionally, the method further includes: The network control apparatus sends scheduling information to the at least one first target terminal, where the scheduling information indicates a third time-frequency resource used for each of the at least one first target terminal; and correspondingly, each first target terminal receives the scheduling information from the network control apparatus, and transmits data with the network control apparatus on the third time-frequency resource.

Optionally, the network control apparatus may send the scheduling information to the at least one first target terminal in a plurality of manners. This is not limited in this embodiment of this application.

In a first possible implementation, the network control apparatus may send scheduling information of each first target terminal to each first target terminal, where the scheduling information of each first target terminal indicates the third time-frequency resource of each first target terminal.

In a second possible implementation, the network control apparatus may send a system broadcast message, where the system broadcast message includes the scheduling information, and the scheduling information indicates the third time-frequency resource of each first target terminal.

For example, the scheduling information indicates a correspondence between identity information of each first target terminal and the third time-frequency resource of each first target terminal.

In a third possible implementation, when a quantity of the at least one target terminal is greater than 1, the network control apparatus may perform group-based scheduling on the at least one target terminal.

It should be noted that, to reduce signaling overheads, the network control may directly send the scheduling information to the at least one target terminal without sending the indication information to the at least one target terminal.

In other words, provided that the scheduling information is received, the first target terminal can determine that the first target terminal successfully performs access.

Optionally, at least one second target terminal that fails to perform access in the at least one terminal on the second time-frequency resource may initiate access to the network control apparatus again.

In a possible implementation, each of the at least one second target terminal may send access information of each second target terminal to the network control apparatus on a fourth time-frequency resource. Correspondingly, the network control apparatus receives the access information from the at least one second target terminal on the fourth time-frequency resource.

Specifically, each second target terminal may send the access information of each second target terminal to the network control apparatus on a fifth time-frequency resource corresponding to each second target terminal, where the fourth time-frequency resource includes the fifth time-frequency resource corresponding to each of the plurality of second target terminals. Correspondingly, the network control apparatus receives the access information from each second target terminal on the fifth time-frequency resource corresponding to each second target terminal.

It should be noted that, for a process in which a second target terminal sends access information of the second target terminal to the network control apparatus on the fifth time-frequency resource corresponding to the second target terminal, refer to the process in which the first terminal sends the access information of the first terminal to the network control apparatus on the second time-frequency resource corresponding to the first terminal. To avoid repetition, details are not described herein again.

Optionally, the first time-frequency resource includes the fourth time-frequency resource, or the fourth time-frequency resource is different from the first time-frequency resource.

In a first possible implementation, the first time-frequency resource may include a second time-frequency resource corresponding to each terminal and the fourth time-frequency resource.

It should be noted that a start moment of the fourth time-frequency resource in time domain is not earlier than an end moment of the second time-frequency resource corresponding to each terminal in time domain.

In a second possible implementation, when at least two terminals in the plurality of terminals have different attributes, the first time-frequency resource may include a time-frequency sub-resource corresponding to a terminal with a different attribute and the fourth time-frequency resource.

It should be noted that a start moment of the fourth time-frequency resource in time domain is not earlier than an end moment of the time-frequency sub-resource corresponding to the terminal with the different attribute in time domain.

In conclusion, the first time-frequency resource may include two phases in time domain. A first phase is used by a plurality of terminals to perform group access or batch access, and a second phase is used by a terminal that fails to perform access in the first phase to perform access again.

In a third possible implementation, the fourth time-frequency resource is a time-frequency resource other than the first time-frequency resource.

It should be noted that a start moment of the fourth time-frequency resource in time domain is not earlier than an end moment of the first time-frequency resource in time domain.

In conclusion, the first time-frequency resource is used by the plurality of terminals to perform group access or batch access, and the fourth time-frequency resource is used by the terminal that fails to perform access on the first time-frequency resource to perform access again.

Optionally, the second target terminal may determine the fourth time-frequency resource in a plurality of manners. This is not limited in this embodiment of this application.

In a possible implementation, the resource configuration information is further used to configure the fourth time-frequency resource used by the at least one second target terminal to perform access again.

In another possible implementation, the network control apparatus may send fourth access configuration information to the at least one second target terminal, where the fourth access configuration information indicates the fourth time-frequency resource.

According to a second aspect, an embodiment of this application further provides an access control method. The method is applied to a network control apparatus, and the method includes the steps performed by the network control apparatus according to any one of the first aspect or the possible implementations of the first aspect.

According to a third aspect, an embodiment of this application further provides an access method. The method is applied to a terminal, and the method includes the steps performed by the terminal according to any one of the first aspect or the possible implementations of the first aspect.

According to a fourth aspect, an embodiment of this application further provides an access control apparatus, configured to perform the method performed by the network control apparatus according to any one of the first aspect or the possible implementations of the first aspect. Specifically, the access apparatus may include units configured to perform the method implemented by the network control apparatus according to any one of the first aspect or the possible implementations of the first aspect.

According to a fifth aspect, an embodiment of this application further provides an access apparatus, configured to perform the method performed by the terminal according to any one of the first aspect or the possible implementations of the first aspect. Specifically, the access apparatus may include units configured to perform the method implemented by the terminal according to any one of the first aspect or the possible implementations of the first aspect.

According to a sixth aspect, an embodiment of this application further provides an access control apparatus. The apparatus includes a memory, at least one processor, a transceiver, and instructions that are stored in the memory and that can be run on the processor. Further, the memory, the processor, and the communication interface communicate with each other through an internal connection path. The at least one processor executes the instructions, so that the access apparatus implements the method performed by the network control apparatus according to any one of the first aspect or the possible implementations of the first aspect.

In a possible implementation, the access control apparatus may be a network control apparatus, for example, a CDC.

According to a seventh aspect, an embodiment of this application further provides an access apparatus. The apparatus includes a memory, at least one processor, a transceiver, and instructions that are stored in the memory and that can be run on the processor. Further, the memory, the processor, and the communication interface communicate with each other through an internal connection path. The at least one processor executes the instruction, so that the access apparatus implements the method performed by the terminal according to any one of the first aspect or the possible implementations of the first aspect.

In a possible implementation, the access apparatus may be a terminal.

According to an eighth aspect, this application further provides a computer-readable storage medium, configured to store a computer program. The computer program includes instructions used to implement the method performed by the network control apparatus or the method performed by the terminal according to any one of the first aspect or the possible implementations of the first aspect.

According to a ninth aspect, this application further provides a computer program product including instructions. When the computer program product runs on a computer, the computer is enabled to implement the method performed by the network control apparatus or the method performed by the terminal according to the foregoing aspects or any possible implementation of the foregoing aspects.

According to a tenth aspect, this application further provides a chip apparatus, including an input interface, an output interface, and at least one processor. Optionally, the chip apparatus further includes a memory. The at least one processor is configured to execute code in the memory. When the at least one processor executes the code, the chip apparatus implements the method performed by the network control apparatus or the method performed by the terminal according to any one of the first aspect or the possible implementations of the first aspect.

DESCRIPTION OF EMBODIMENTS

The following describes technical solutions in this application with reference to the accompanying drawings.

Figure 1:
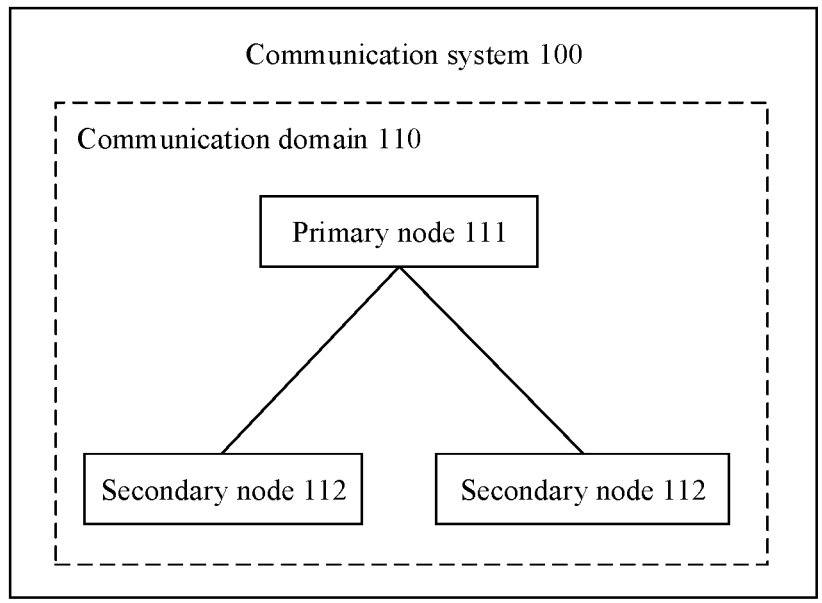
FIG. 1 is a schematic block diagram of a communication system 100 according to an embodiment of this application.

FIG. 1 is a schematic block diagram of a communication system 100 according to an embodiment of this application. The communication system 100 includes at least one communication domain. FIG. 1 shows a communication domain 110. The communication domain 110 includes a primary node 111 and at least one secondary node 112.

It should be noted that the primary node 111 in this embodiment of this application is an apparatus that can communicate with the secondary node 112 and that has a capability of managing the secondary node 112 (for example, scheduling a resource for the secondary node 112).

It should be further noted that the secondary node 112 in this embodiment of this application is an apparatus that can follow management of the primary node 111 and that has a capability of performing communication by using the resource allocated by the primary node 111.

Optionally, the communication domain 110 is applicable to a cockpit (also referred to as a cabin) of a motor vehicle (for example, an intelligent vehicle, an electric vehicle, or a digital vehicle).

In a possible implementation, the primary node 111 may be a network control apparatus, and the secondary node 112 may be a terminal.

Optionally, the network control apparatus may be in a plurality of forms. This is not limited in this embodiment of this application.

In a possible implementation, the network control apparatus may be an independent device.

In another possible implementation, the network control apparatus may be integrated into another device as a function module or a chip apparatus.

It should be noted that the network control apparatus in this embodiment of this application may also be referred to as an access device or a radio access network device, and may be an evolved NodeB (evolved NodeB, eNB or eNodeB) in a long term evolution (long term evolution, LTE) system, or may be a radio controller in a cloud radio access network (cloud radio access network, CRAN) scenario. Alternatively, the access device may be a relay station, an access point, a vehicle-mounted device, a wearable device, an access device in a 5G network, or a network device in a future evolved public land mobile network (public land mobile network, PLMN), may be an access point (access point, AP) in a wireless local area network (wireless local area network, WLAN), may be a gNB in a new radio (new radio, NR) system, or the like. This is not limited in this embodiment of this application.

Optionally, the access device is a device in a radio access network (radio access network, RAN), or a RAN node through which the terminal accesses a wireless network. By way of example but not limitation, an access network device may be a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless fidelity (wireless fidelity, Wi-Fi) access point (access point, AP), or the like. In a network structure, the network device may include a centralized unit (centralized unit, CU) node or a distributed unit (distributed unit, DU) node, a RAN device including a CU node and a DU node, or a RAN device including a control plane CU node (CU-CP node), a user plane CU node (CU-UP node), and a DU node.

Optionally, the terminal may be in a plurality of forms. This is not limited in this embodiment of this application.

In a possible implementation, the terminal may be an independent device.

In another possible implementation, the terminal may be integrated into another device as a function module or a chip apparatus.

It should be noted that the terminal in this embodiment of this application may be a device that provides voice/data connectivity for a user, for example, a handheld device or a vehicle-mounted device with a wireless connection function. Currently, some examples of the terminal are a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in self-driving (self-driving), a cellular phone, a cordless phone, a session initiation protocol (session initiation protocol, SIP) phone, a personal digital assistant (personal digital assistant, PDA), a handheld device with a wireless communication function, a computing device, a vehicle-mounted device, a wearable device, a terminal device in a 5G network, and a terminal device in a future evolved public land mobile network (public land mobile network, PLMN). This is not limited in this embodiment of this application.

It should be further noted that the wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn on the body or integrated into clothes or an accessory of a user.

It should be further noted that, in this embodiment of this application, terminals are classified into a "vehicle-mounted terminal" and a "non-vehicle-mounted terminal" based on a relationship between a terminal and a cockpit.

The "vehicle-mounted terminal", also referred to as an on-board unit (on-board unit, OBU), is a device that is integrated into or installed on a cockpit domain and that belongs to a part of the cockpit domain, for example, a vehicle-mounted speaker, a vehicle-mounted microphone, or a vehicle-mounted display. Generally, the vehicle-mounted terminal may be a device factory-installed (factory-installed) on a vehicle by a vehicle manufacturer.

The "non-vehicle-mounted terminal" is a device that is placed in a cockpit domain and that can communicate with or connect to another device in the cockpit domain, but does not belong to a part of the cockpit, for example, an intelligent terminal, a tablet computer, a Bluetooth headset, or a wearable device of a user.

In a possible implementation, the network control apparatus in this embodiment of this application may be a cockpit domain controller (cockpit domain controller, CDC), and the at least one terminal may include at least one of the vehicle-mounted terminal or the non-vehicle-mounted terminal.

For example, the CDC may communicate with the vehicle-mounted display, the intelligent terminal, and the vehicle-mounted speaker.

It should be noted that the vehicle manufacturer may integrate both the CDC and the at least one vehicle-mounted terminal into the vehicle, for example, into the cabin domain of the vehicle.

In another possible implementation, the network control apparatus in this embodiment of this application may be an intelligent terminal, and the at least one terminal may include at least one of the vehicle-mounted terminal or the non-vehicle-mounted terminal.

For example, the intelligent terminal may communicate with the vehicle-mounted speaker, the Bluetooth headset, and the vehicle-mounted microphone.

Optionally, the network control apparatus may communicate with the terminal in a plurality of manners. This is not limited in this embodiment of this application.

In a possible implementation, the network control apparatus may communicate with the terminal in a wired manner.

It should be noted that the foregoing wired manner may be implementing communication through a data cable connection or an internal bus connection.

In another possible implementation, the network control apparatus may communicate with the terminal in a wireless manner.

It should be noted that the foregoing wireless manner may be implementing communication through a communication network. The communication network may be a local area network, or may be a wide area network transferred by using a relay (relay) device, or may include a local area network and a wide area network. For example, when the communication network is a local area network, the communication network may be a Wi-Fi hotspot network, a Wi-Fi P2P network, a Bluetooth network, a ZigBee network, a near field communication (near field communication, NFC) network, or a possible future universal short-range communication network. For example, when the communication network is a wide area network, the communication network may be a 3rd-generation mobile communication technology (3rd-generation wireless telephone technology, 3G) network, the 4th-generation mobile communication technology (the 4th-generation mobile communication technology, 4G) network, a 5th-generation mobile communication technology (5th-generation mobile communication technology, 5G) network, a PLMN, or the internet. This is not limited in this embodiment of this application.

Figure 2:
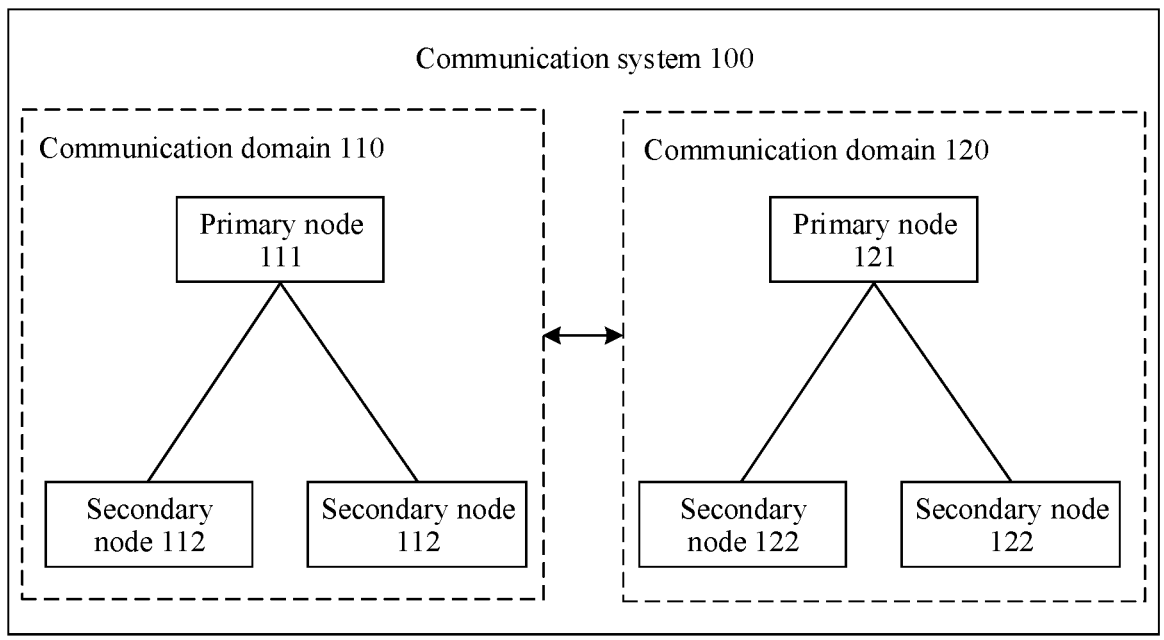
FIG. 2 is another schematic block diagram of a communication system 100 according to an embodiment of this application.

It should be noted that FIG. 1 shows only an example of the communication domain 110, and the communication system 100 may further include another communication domain. As shown in FIG. 2, the communication system 100 may further include a communication domain 120, the communication domain 120 includes a primary node 121 and at least one secondary node 122, and the primary node 121 may communicate with the at least one secondary node 122.

It should be noted that the communication domain 110 may communicate with the communication domain 120.

For example, two primary nodes belonging to different communication domains may communicate with each other.

Optionally, the communication domain 120 is applicable to a cockpit (also referred to as a cabin) of a motor vehicle (for example, an intelligent vehicle, an electric vehicle, or a digital vehicle).

Optionally, the communication domain 110 and the communication domain 120 may belong to different domains in a same vehicle (or a cabin). For example, the communication domain 110 is an entertainment domain, and the communication domain 120 is a driving domain. Alternatively, the communication domain 110 and the communication domain 120 may belong to different vehicles (cabins). This is not limited in this embodiment of this application.

In an existing wireless communication system, a terminal accesses a network device through random access, for example, contention-based random access. Access requirements comply with Poisson distribution due to random arrival of terminals, that is, access requests of the terminals are approximately average in terms of time. When the terminals request random access, there is another terminal that is being served in the system.

The network device usually allocates some limited and fixed time-frequency resources in currently available time-frequency resources to the terminal for random access, for example, two fixed symbols (symbol) in an available time domain slot (slot) and two fixed subcarriers (subcarrier) in an available frequency domain bandwidth, and the other available time-frequency resources are used to maintain and guarantee a service of another terminal.

However, when the vehicle is powered on, there may be a scenario in which a plurality of vehicle-mounted terminals in the communication domain of the cockpit all initiate access requests to the CDC in a short period of time. In the foregoing scenario of batch access or group access of terminals, if the plurality of vehicle-mounted terminals perform contention-based random access by using the existing random access method, that is, by using the fixed and limited time-frequency resources that are used for random access, a severe resource conflict may occur. Consequently, batch access or group access of the vehicle-mounted terminals cannot be implemented.

Embodiments of this application provide an access method and apparatus, to implement batch access or group access of terminals in the foregoing scenario.

Figure 3:
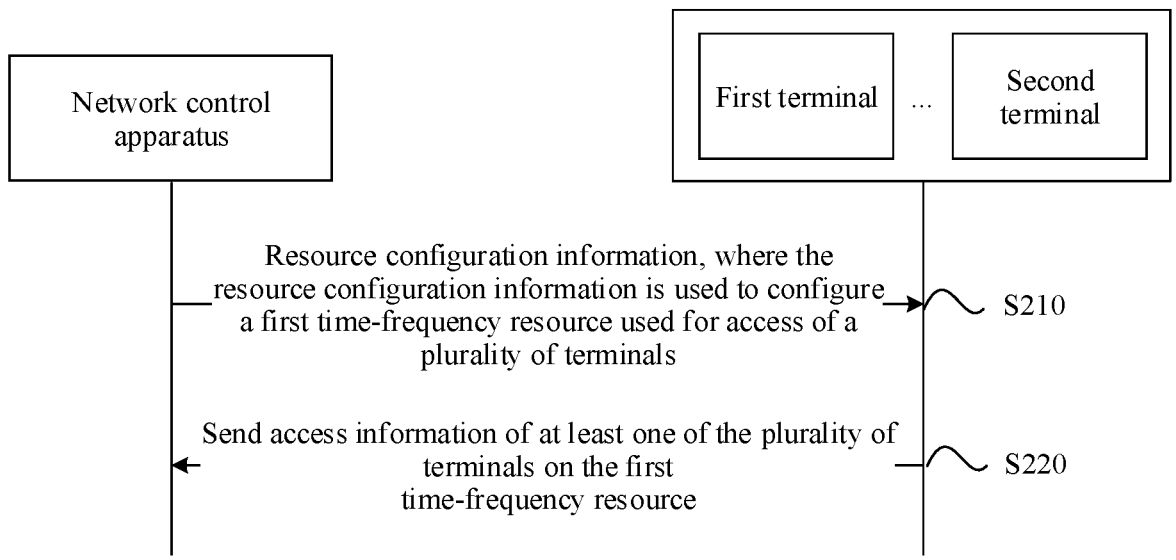
FIG. 3 is a schematic flowchart of an access method 200 according to an embodiment of this application.

FIG. 3 is a schematic flowchart of an access method 200 according to an embodiment of this application. The method 200 is applied to the communication system 100 shown in FIG. 1, for example, the communication domain 110 in the communication system 100, and is applicable to a cockpit of a vehicle.

S210: A network control apparatus sends resource configuration information, where the resource configuration information is used to configure a first time-frequency resource used by a plurality of terminals to access a network. Correspondingly, the plurality of terminals receive the resource configuration information from the network control apparatus. Specifically, the resource configuration information is used to configure the plurality of terminals to perform initial access.

Optionally, the network control apparatus and the plurality of terminals each may be in a plurality of forms. This is not limited in this embodiment of this application.

In a possible implementation, the network control apparatus may be a CDC in a cabin, the plurality of terminals may be a plurality of vehicle-mounted terminals in the cabin, and a vehicle manufacturer integrates the CDC and the plurality of vehicle-mounted terminals into a vehicle in which the cabin is located.

It should be noted that before S210, the plurality of terminals are in a non-connected state. In other words, none of the plurality of terminals accesses the network control apparatus or establishes a connection to the network control apparatus.

It should be further noted that the non-connected state in this embodiment of this application may include an idle state or a deactivated state.

In other words, a status of the terminal may include a connected state and the non-connected state, and the non-connected state may include the idle state or the deactivated state.

The following separately describes the connected state, the idle state, and the deactivated state.

(1) The connected state, also referred to as a radio resource control (radio resource control, RRC) connected state, is a state in which the terminal establishes a network connection to the network control apparatus and can perform data transmission.

(2) The idle state, also referred to as an RRC idle state, is a state in which the terminal does not establish a network connection to the network control apparatus, and the network control apparatus does not store context information of the terminal. In other words, if the terminal needs to enter the connected state from the idle state, the terminal needs to initiate a network connection establishment process.

(3) The deactivated state, also referred to as an RRC deactivated state, is a state in which the terminal previously enters the connected state, and then the network control apparatus suspends a network connection, but the network control apparatus stores context information of the terminal. In other words, if the terminal needs to enter the connected state from the deactivated state again, the terminal needs to initiate a network connection restoration process (or referred to as a network connection re-establishment process). It should be noted that, compared with the network connection establishment process, the network connection restoration process has a shorter delay and lower signaling overheads. However, the network control apparatus needs to store the context of the terminal, which occupies storage overheads of the network control apparatus.

Optionally, before S210, the network control apparatus needs to first determine the first time-frequency resource.

In a possible implementation, the first time-frequency resource is an available time-frequency resource in the communication domain in which the network control apparatus is located. Compared with a limited and fixed time-frequency resource preconfigured in an existing random access manner, the available time-frequency resource can provide more sufficient resources to meet group access of the plurality of terminals.

For example, the first time-frequency resource may include all available time-frequency resources in the communication domain in which the network control apparatus is located.

It should be noted that all the available time-frequency resources in this embodiment of this application may also be referred to as all time-frequency resources that may be used for initial access. Further, all the time-frequency resources occupy at least one time domain resource unit (or a first time domain length) and at least one frequency domain resource unit (or a first frequency domain bandwidth). Because there is no vehicle-mounted device to access when the vehicle is just powered on, all the available time-frequency resources may be used as access resources.

Optionally, the at least one time domain resource unit (or the first time domain length) may be consecutive or discrete, or the at least one frequency domain resource unit (or the first frequency domain bandwidth) may be consecutive or discrete. This is not limited in this embodiment of this application.

It should be further noted that the time domain resource unit may be understood as a granularity for scheduling in time domain, for example, a minimum granularity, and the frequency domain resource unit may be understood as a granularity for scheduling in frequency domain.

Specifically, the time domain resource unit may be but is not limited to a slot (slot) or a frame, and the frame or the slot includes several symbols (symbols). For example, the symbol is an orthogonal frequency division multiplexing (orthogonal frequency division multiplexing, OFDM) symbol. The frequency domain resource unit may be but is not limited to one or more subcarriers.

It should be noted that all the available time-frequency resources or all the time-frequency resources used for initial access are all available time-frequency resources in the communication domain that are used to transmit data, that is, time-frequency resources of a data channel.

Optionally, time domain resources in all the time-frequency resources used for initial access may have a limited length.

In a possible implementation, after the plurality of terminals complete initial access by using all the time-frequency resources used for initial access, the network control apparatus may send a system broadcast message used to indicate that the initial access has been completed. Correspondingly, a subsequent terminal having an access requirement performs random access on the preconfigured limited time-frequency resource used for random access according to the existing random access method.

It should be further noted that all the available time-frequency resources or all the time-frequency resources used for initial access do not include an available time-frequency resource of a symbol (for example, a symbol carrying a pilot signal, a synchronization signal, a control signal, or a broadcast signal) that is in the communication domain and that is used to carry system control plane overheads.

In other words, all the available time-frequency resources or all the time-frequency resources used for initial access do not include a time-frequency resource used for control information or a control signal. The control information herein may include control signaling used for scheduling data, such as broadcast channel information and data feedback information. The control signal herein may include a synchronization signal, an access channel signal, an SRS, a DMRS, or the like.

In the access method provided in this embodiment of this application, in a scenario of group access or batch access, when the vehicle is just powered on, there is no terminal to access in the communication domain in which the network control apparatus is located. Therefore, the network control apparatus can calculate or determine all the available time-frequency resources in the current communication domain, and allocate all the time-frequency resources to these terminals for group access or batch access. This can meet a requirement of group access or batch access and reduce a probability of a resource conflict generated during access of the plurality of terminals.

Optionally, the network control apparatus may determine the first time-frequency resource in a plurality of manners. This is not limited in this embodiment of this application.

In a possible implementation, for example, the network control apparatus and the plurality of terminals belong to a first communication domain. The network control apparatus may receive a system broadcast message from a second network control apparatus in a second communication domain, where the system broadcast message indicates all time-frequency resources occupied by the second communication domain. The network control apparatus may determine the first time-frequency resource based on all the time-frequency resources occupied by the second communication domain, where all the time-frequency resources occupied by the second communication domain are different from the first time-frequency resource.

Optionally, the first communication domain and the second communication domain may belong to a same cabin or different cabins. This is not limited in this embodiment of this application.

It should be noted that the manner in which the network control apparatus determines the first time-frequency resource is merely described above by using an example in which the network control apparatus determines the first time-frequency resource based on all the time-frequency resources occupied by the second communication domain. However, this embodiment of this application is not limited thereto.

Optionally, the network control apparatus may determine the first time-frequency resource based on all time-frequency resources occupied by a plurality of communication domains. The plurality of communication domains include the second communication domain. This is not limited in this embodiment of this application.

In another possible implementation, the network control apparatus may obtain the first time-frequency resource by using a higher-layer network device. The higher-layer network device can calculate all available time-frequency resources in a communication domain in which each network control apparatus is located, and allocate all the time-frequency resources to each network control apparatus. Optionally, the network control apparatus receives indication information from another network device, where the indication information indicates the first time-frequency resource.

For example, the network control apparatus is an access network device. The network control apparatus may send a resource request to a core network device, where the resource request requests all time-frequency resources currently available to the network control apparatus, and receive resource information sent by the core network device, where the resource information indicates the first time-frequency resource.

Optionally, in S210, the network control apparatus may send the resource configuration information in a plurality of manners. This is not limited in this embodiment of this application.

In a first possible implementation, the network control apparatus may send the resource configuration information to each of the plurality of terminals.

In a second possible implementation, the network control apparatus may send a multicast message, where the multicast message includes the resource configuration information and a multicast address.

It should be noted that the multicast address is an address for a group of terminals, and a message sent for the address may be identified and received by the group of terminals.

For example, the plurality of terminals include a terminal 1 and a terminal 2, the terminal 1 and the terminal 2 belong to a first terminal group, and the multicast message sent by the network control apparatus includes the resource configuration information and a multicast address for the first terminal group. Correspondingly, the terminal 1 and the terminal 2 receive the multicast message sent for the multicast address corresponding to the group to which the terminal 1 and the terminal 2 belong.

Optionally, the multicast message may further include terminal quantity information, and the terminal quantity information indicates a quantity of terminals corresponding to the multicast address.

In a third possible implementation, the network control apparatus may send a system broadcast message, where the system broadcast message includes the resource configuration information.

For example, the system broadcast message may be a master information block (master information block, MIB) message or a system information block (system information block, SIB) message.

According to the access method provided in this embodiment of this application, the network control apparatus uses the multicast message or the system broadcast message to carry the resource configuration information. This can reduce a transmission delay and improve access efficiency.

S220: At least one of the plurality of terminals sends access information of each of the at least one terminal to the network control apparatus on the first time-frequency resource, where the access information of the terminal includes at least one of first identity information or status information, the first identity information identifies the terminal, and the status information indicates a status of the terminal. Correspondingly, the network control apparatus receives the access information of each of the at least one terminal on the first time-frequency resource.

For clarity, the following describes a process of S220 by using a first terminal in the at least one terminal as an example.

It should be noted that the first terminal is any one of the at least one terminal, and a process in which another terminal in the at least one terminal performs S220 is similar to a process in which the first terminal performs S220. To avoid repetition, details are not described herein.

To be specific, S220 may be: The first terminal sends access information of the first terminal to the network control apparatus on the first time-frequency resource. Correspondingly, the network control apparatus receives the access information of the first terminal on the first time-frequency resource.

Optionally, the access information may be carried in an access message, where the access message is obtained by performing modulation and coding on the access information by using predefined modulation and coding information, and the modulation and coding information includes at least one of a modulation and coding scheme, a channel coding scheme, and a bit rate.

Correspondingly, the network control apparatus may decode the access message based on the preconfigured modulation and coding information, to obtain the access information.

Optionally, the network control apparatus and the first terminal may obtain the modulation and coding information in a plurality of manners. This is not limited in this embodiment of this application.

In a first possible implementation, the modulation and coding information may be predefined in a communication protocol, and the first terminal and the network control apparatus may determine the modulation and coding information based on the communication protocol.

In a second possible implementation, the network control apparatus may send first access configuration information to the first terminal, where the first access configuration information is used to configure the modulation and coding information. Correspondingly, the first terminal receives the first access configuration information from the network control apparatus, and determines the modulation and coding information based on the first access configuration information. Specifically, the first access configuration information may be sent to the first terminal in advance, or sent to the first terminal together with the resource configuration information.

Optionally, the resource configuration information and the first access configuration information may be carried in a same message, or may be carried in different messages. This is not limited in this embodiment of this application.

In a third possible implementation, the first terminal and the network control apparatus may agree on the modulation and coding information in advance.

Optionally, the access information of the first terminal may include at least one of the first identity information or the status information. This is not limited in this embodiment of this application.

It should be noted that the first identity information may be understood as information that can uniquely identify an identity of the first terminal in a communication domain in which the first terminal is located.

Optionally, the identity information (for example, the first identity information) in this embodiment of this application may include at least one of the following items: a device identifier, a MAC address, a soft address, and a short address.

It should be noted that the device identifier is a string of digits or a serial number that can uniquely identify the terminal, for example, an international mobile equipment identity (international mobile equipment identification number, IMEI) or a mobile equipment identifier (mobile equipment identifier, MEID).

It should be further noted that the MAC address is an address used at a media access layer, and is also referred to as a physical address or a hardware address.

It should be further noted that the soft address may be an address that is allocated by the network control apparatus to the first terminal during last access of the terminal and that can uniquely identify the terminal in the communication domain.

It should be further noted that the short address may be an address obtained based on a part of at least one of the device identifier, the MAC address, and the soft address.

For example, the network control apparatus may generate the short address by using the least significant 10 bits of any one of the foregoing addresses of the first terminal, and the generated short address can uniquely identify the first terminal in the communication domain.

Optionally, the identity information (for example, the first identity information) of the terminal in this embodiment of this application may include at least one field. The network control apparatus and the first terminal may define meanings of different fields in a plurality of manners. This is not limited in this embodiment of this application.

In a possible implementation, the identity information may include a first field, and the first field indicates a device type.

For example, the first field includes two bits. "00" indicates a CDC, "01" indicates a vehicle-mounted terminal, and "10" indicates a "non-vehicle-mounted terminal".

In another possible implementation, the identity information may include a second field, and the second field indicates a device function.

For example, the second field includes one bit. "1" indicates a primary node, and "0" indicates a secondary node.

In still another possible implementation, the identity information may include a third field, and the third field indicates a device number.

For example, the third field includes three bits. "010" indicates that the number is 2, "100" indicates that the number is 4, and "111" indicates that the number is 7.

It should be noted that the status information may be understood as information that can indicate a current status of the first terminal.

Optionally, the first terminal may include a first state or a second state.

For example, the first state may be a "normal state", and the second state may be an "abnormal state".

Optionally, when the status information indicates that the status of the first terminal is the "abnormal state", the status information may further include exception indication information, and the exception indication information indicates an exception cause of the first terminal.

Optionally, the status information may indicate the status of the first terminal in a plurality of manners. This is not limited in this embodiment of this application.

In a possible implementation, the status information may include at least one bit, and the status information may indicate the current status of the first terminal by using the at least one bit.

For example, the status information includes one bit. When the bit is "1", the "normal state" is indicated. When the bit is "0", the "abnormal state" is indicated.

In another possible implementation, the status information may include the exception indication information, and the exception indication information indicates that the status of the first terminal is the "abnormal state" and indicates the exception cause.

Optionally, the at least one terminal in S220 may include some or all of the plurality of terminals. This is not limited in this embodiment of this application.

It should be noted that, because some terminals may be in an abnormal state after being powered on, for example, may encounter a device fault, a line fault, or a network fault, the network control apparatus may agree with the plurality of terminals in advance that only a terminal in a normal state reports access information to the network control apparatus, and a terminal in an abnormal state does not need to report access information. In this case, the at least one terminal includes some terminals that are in the plurality of terminals and that are in a normal state.

Optionally, the first terminal may send the access information of the first terminal to the network control apparatus on the first time-frequency resource in a plurality of manners. This is not limited in this embodiment of this application.

In a first possible implementation, the first terminal may send the access information of the first terminal to the network control apparatus on the first time-frequency resource in a contention-based resource manner.

Because the first time-frequency resource indicates all the available time-frequency resources in the communication domain in which the network control apparatus is located, a resource size of the first time-frequency resource is larger than a resource size of the preconfigured limited time-frequency resource used for random access in the existing contention-based random access method. This can reduce a probability of a resource conflict generated during access of the plurality of terminals.

In a second possible implementation, the first terminal may determine, from the first time-frequency resource, a second time-frequency resource corresponding to each terminal. The first terminal sends the access information of the first terminal to the network control apparatus on the second time-frequency resource corresponding to the first terminal.

It should be noted that the second time-frequency resource corresponding to the first terminal in this embodiment of this application may be understood as a time-frequency resource used by the first terminal to report the access information.

In other words, the first time-frequency resource may include at least one second time-frequency resource, and the at least one second time-frequency resource is in a one-to-one correspondence with the at least one terminal.

It should be further noted that second time-frequency resources corresponding to all of the plurality of terminals are orthogonal to each other. In other words, second time-frequency resources corresponding to any two terminals do not overlap each other in time-frequency or frequency domain.

For example, the plurality of terminals include the first terminal and a second terminal, and the second time-frequency resource corresponding to the first terminal and a second time-frequency resource corresponding to the second terminal do not overlap each other in time-frequency or frequency domain.

According to the access method provided in this embodiment of this application, the second time-frequency resources corresponding to all of the plurality of terminals are orthogonal to each other, so that a probability of a resource conflict generated during access of the plurality of terminals can be avoided.

Optionally, the second time-frequency resource corresponding to the first terminal may be indicated by using at least one of the following items: second identity information of the first terminal, a resource size of the first time-frequency resource, a resource size of the second time-frequency resource corresponding to the first terminal, or at least one preconfigured value. This is not limited in this embodiment of this application.

It should be noted that the second identity information of the first terminal may be understood as information that can uniquely identify the identity of the terminal in the communication domain in which the first terminal is located.

Optionally, the second identity information may include at least one of the following items: a device identifier, a MAC address, a soft address, or a short address.

Optionally, the first identity information and the second identity information of the first terminal may be the same or may be different. This is not limited in this embodiment of this application.

For example, the first identity information may include a MAC address, and the second identity information may include a soft address.

For another example, the first identity information may include a MAC address and a device identifier, and the second identity information may include a soft address.

Optionally, the resource size of the time-frequency resource (for example, the resource size of the first time-frequency resource or the resource size of the second time-frequency resource) in this embodiment of this application may represent any one of the following meanings: a quantity of resource elements (resource elements, REs) included in the time-frequency resource, a quantity of channels included in the time-frequency resource, a quantity of time domain resource units and a quantity of frequency domain resource units included in the time-frequency resource, or a time domain length and a frequency domain bandwidth of the time-frequency resource. However, a person skilled in the art may learn that the foregoing meanings are merely used as examples for description, and do not limit a meaning of a resource size.

Optionally, the first terminal may determine, in a plurality of manners, the resource size of the second time-frequency resource corresponding to the first terminal. This is not limited in this embodiment of this application.

In a possible implementation, the first terminal may determine, based on the modulation and coding information and a size of the access information, the resource size of the second time-frequency resource corresponding to the first terminal.

In a second possible implementation, before S220, the first terminal may receive second access configuration information from the network control apparatus, where the second access configuration information is used to configure the resource size of the second time-frequency resource corresponding to the first terminal.

Optionally, the resource configuration information and the second access configuration information may be carried in a same message, or may be carried in different messages. This is not limited in this embodiment of this application.

In a third possible implementation, the first terminal and the network control apparatus may agree in advance on the resource size of the second time-frequency resource corresponding to the first terminal. In other words, the resource size of the second time-frequency resource is preconfigured or predefined.

It should be noted that the at least one preconfigured value may be a preconfigured value used to determine a second time-frequency resource corresponding to each terminal.

In a possible implementation, the at least one value may include a first value, and the first value indicates a quantity of terminals.

For example, the quantity of terminals may indicate a quantity of terminals in a group corresponding to a multicast address.

For another example, the quantity of terminals may be a quantity of terminals that make an incoming call by the network control apparatus based on the resource configuration information.

Optionally, the at least one value may be preconfigured for the terminals in a plurality of manners. This is not limited in this embodiment of this application.

In a first possible implementation, the at least one value may be preconfigured in a communication protocol, and the first terminal may obtain the at least one value based on the communication protocol.

In a second possible implementation, before S220, the first terminal may receive third access configuration information from the network control apparatus, where the third access configuration information is used to configure the at least one value.

Optionally, the resource configuration information and the third access configuration information may be carried in a same message, or may be carried in different messages. This is not limited in this embodiment of this application.

In a third possible implementation, the first terminal and the network control apparatus may agree on the at least one value in advance.

Optionally, the first terminal may determine, from the first time-frequency resource in a plurality of manners, the second time-frequency resource corresponding to the first terminal. This is not limited in this embodiment of this application.

In a first possible implementation, the first terminal may determine, based on the resource size of the first time-frequency resource and the resource size of the second time-frequency resource corresponding to the first terminal, the second time-frequency resource corresponding to the first terminal.

For example, the first terminal may determine, based on the resource size $N_1$ of the second time-frequency resource corresponding to the first terminal and the resource size N of the first time-frequency resource, a quantity of pieces of access information that can be reported on the first time-frequency resource Nu=$\lfloor N/N1 \rfloor$ ($\lfloor \ \rfloor$ represents rounding down). The first terminal randomly generates an integer M from [0, $N_u$-1] or [1, $N_u$], and determines a first resource block numbered M in the $N_u$ resource blocks included in the first time-frequency resource as the second time-frequency resource corresponding to the first terminal.

It should be noted that, because the network control apparatus and the first terminal may be produced by a same vehicle manufacturer, the vehicle manufacturer may preconfigure, for the network control apparatus, related information (for example, the second identity information of the first terminal, the resource size of the second time-frequency resource corresponding to the first terminal, and the at least one value) used to determine the second time-frequency resource corresponding to the first terminal and a calculation rule of the second time-frequency resource corresponding to the first terminal. Therefore, the network control apparatus does not need to perform additional signaling interaction with the first terminal to obtain the related information required for determining the second time-frequency resource corresponding to the first terminal. This can reduce signaling overheads, and reduce an access delay.

It should be further noted that the network control apparatus and the first terminal may agree on a division rule and a number rule of the $N_u$ resource blocks in advance, and the network control apparatus and the first terminal may determine a number and a resource size of each of the $N_u$ resource blocks according to the number rule and the division rule.

In other words, the network control apparatus and the first terminal can determine, by using a similar method, the second time-frequency resource corresponding to the first terminal.

However, in the foregoing first possible implementation, because M is a random number selected by the first terminal, the network control apparatus cannot learn a random number that is randomly selected by the first terminal. Therefore, the network control apparatus needs to receive, on the first time-frequency resource, the access information reported by the first terminal.

When the quantity of at least one terminal that reports access information to the network control apparatus is far less than $N_u$, the foregoing method for randomly selecting the resource block can ensure that different terminals select different resource blocks to send access information. This can reduce a probability of a resource conflict.

In a second possible implementation, the first terminal may determine, based on the resource size of the first time-frequency resource, the resource size of the second time-frequency resource corresponding to the first terminal, and the second identity information of the first terminal, the second time-frequency resource corresponding to the first terminal.

For example, the second identity information includes a MAC address. The first terminal may determine, based on the resource size $N_1$ of the second time-frequency resource corresponding to the first terminal and the resource size N of the first time-frequency resource, a quantity of pieces of access information that can be reported on the first time-frequency resource Nu=$\lfloor N/N1 \rfloor$ ($\lfloor \ \rfloor$ represents rounding down). The first terminal may perform a modulo operation on the MAC address and $N_u$ to obtain an integer M, and determine a first resource block numbered M in the $N_u$ resource blocks included in the first time-frequency resource as the second time-frequency resource corresponding to the first terminal.

According to the foregoing method for selecting the resource block by using the MAC address, because the MAC address of the first terminal is preconfigured for the network control apparatus, the network control apparatus can directly use the preconfigured MAC address to select the resource block corresponding to the first terminal, and does not need to perform signaling interaction with the first terminal to obtain the MAC address. This can reduce an access delay.

For example, the second identity information includes a soft address. The first terminal may determine, based on the resource size $N_1$ of the second time-frequency resource corresponding to the first terminal and the resource size N of the first time-frequency resource, a quantity of pieces of access information that can be reported on the first time-frequency resource Nu=⌊N/N1⌋ (⌊ ⌋ represents rounding down). The first terminal may perform a modulo operation on the soft address and $N_u$ to obtain an integer M, and determine a first resource block numbered M in the $N_u$ resource blocks included in the first time-frequency resource as the second time-frequency resource corresponding to the first terminal.

It should be noted that, in this embodiment of this application, the network control apparatus may configure a soft address for each terminal in a communication domain to which the terminal belongs, and the soft address of each terminal can uniquely identify each terminal in the communication domain.

In a possible implementation, the soft address of the first terminal may be an address allocated by the network control apparatus to the first terminal during last access of the first terminal.

According to the foregoing method for selecting the resource block by using the soft address, the soft address of each terminal and the resource size of the first time-frequency resource are flexibly configured, so that second time-frequency resources corresponding to different terminals can be effectively staggered. That is, it is ensured that second time-frequency resources determined by each terminal based on the soft address do not overlap each other. This reduces a probability of a resource conflict.

In a third possible implementation, the first terminal may determine, based on the second identity information of the first terminal and the first value, the second time-frequency resource corresponding to the first terminal, where the at least one value includes the first value.

For example, the second identity information includes a MAC address. The first terminal may perform a modulo operation on the MAC address and the first value to obtain an integer M, and determine a first resource block numbered M in resource blocks, with a quantity of first value, included in the first time-frequency resource as the second time-frequency resource corresponding to the first terminal.

Correspondingly, in the foregoing second or third possible implementation, the network control apparatus may determine M based on the preconfigured related information used to determine the second time-frequency resource corresponding to the first terminal. Therefore, that the network control apparatus receives the access information of the first terminal on the first time-frequency resource may include: The network control apparatus receives the access information of the first terminal on the second time-frequency resource corresponding to the first terminal.

According to the foregoing resource block selection method, because second identity information of each terminal is preconfigured in the network control apparatus, second time-frequency resources corresponding to different terminals can be effectively staggered by properly setting the first value. That is, it is ensured that the second time-frequency resources corresponding to different terminals do not overlap each other. This reduces a probability of a resource conflict.

Optionally, at least two terminals in the plurality of terminals may have different attributes. The network control apparatus may configure different time-frequency sub-resources for terminals with different attributes by using the resource configuration information. The first time-frequency resource includes the time-frequency sub-resources corresponding to the terminals with different attributes.

In other words, the first time-frequency resource may include at least two time-frequency sub-resources, the at least two time-frequency sub-resources corresponds to at least two attributes, and each time-frequency sub-resource is used for access of at least one terminal with an attribute corresponding to the time-frequency sub-resource.

In other words, terminals with different attributes perform access on time-frequency sub-resources corresponding to attributes to which the terminals belong. At least one terminal with a same attribute performs access on a time-frequency sub-resource corresponding to the attribute, and the time-frequency sub-resource used for access of the at least one terminal with the same attribute includes a second time-frequency resource of each of the at least one terminal.

Optionally, the attribute may include at least one of a device type, a multicast address, or a device priority.

Specifically, the device type may include a microphone type, a speaker type, a display type, and the like. A specific device type is not limited in this application.

It should be noted that, that multicast addresses of terminals are different may be understood as that the terminals belong to different terminal groups.

Optionally, the device priority of the terminal may be divided in a plurality of manners. This is not limited in this embodiment of this application.

In a possible implementation, the device priority may be divided based on a location area of the terminal in the cabin.

For example, a device priority of a terminal located in a front-row seating area is higher than a device priority of a terminal located in a back-row seating area.

In another possible implementation, the device priority of the terminal may be divided based on the device type of the terminal.

For example, a device priority of a display is higher than a device priority of a speaker, and the device priority of the speaker is higher than a device priority of a microphone.

Optionally, the network control apparatus may configure different time-frequency sub-resources for terminals with different attributes in the following several manners.

For example, the attribute includes a device type, and the plurality of terminals include a microphone 1, a microphone 2, and a display 1. In this case, the microphone 1 and the microphone 2 correspond to a time-frequency sub-resource 1, and the display 1 corresponds to a time-frequency sub-resource 2. The first time-frequency resource includes the time-frequency sub-resource 1 and the time-frequency sub-resource 2.

For another example, the attribute includes a device type and a device priority, and the plurality of terminals may include a speaker 1, a speaker 2, a speaker 3, a display 1, and a display 2 that are located in the front-row seating area, and a speaker 4 and a speaker 5 that are located in the back-row seating area. In this case, the speaker 1, the speaker 2, and the speaker 3 correspond to a time-frequency sub-resource 1, the display 1 and the display 2 correspond to a time-frequency sub-resource 2, and the speaker 4 and the speaker 5 correspond to a time-frequency sub-resource 3. The first time-frequency resource includes the time-frequency sub-resource 1, the time-frequency sub-resource 2, and the time-frequency sub-resource 3.

For another example, the attribute includes a device type, a multicast address, and a device priority. The plurality of terminals may include a speaker 1, a speaker 2, a speaker 3, a speaker 4, and a display 1 that are located in a front-row seating area, and a speaker 5 and a display 2 that are located in a back-row seating area. For example, the speaker 1, the speaker 2, and the display 1 belong to a first terminal group, and the speaker 3, the speaker 4, the speaker 5, and the display 2 belong to a second terminal group. In this case, the speaker 1, the speaker 2, and the display 1 correspond to a time-frequency sub-resource 3, the speaker 4 corresponds to a time-frequency sub-resource 2, and the speaker 5 and the display 2 correspond to a time-frequency sub-resource 3. The first time-frequency resource includes the time-frequency sub-resource 1, the time-frequency sub-resource 2, and the time-frequency sub-resource 3.

In a possible implementation, for example, the plurality of terminals include a first terminal with a first attribute and a second terminal with a second attribute, the first terminal corresponds to a first time-frequency sub-resource in the first time-frequency resource, and the second terminal corresponds to a second time-frequency sub-resource in the first time-frequency resource. S220 may be: The first terminal sends access information of the first terminal to the network control apparatus on the first time-frequency sub-resource; and correspondingly, the network control apparatus receives the access information of the first terminal on the first time-frequency sub-resource.

It should be noted that at least one of time domain resources or frequency domain resources of time-frequency sub-resources corresponding to terminals with different attributes is different.

In other words, the first time-frequency sub-resource does not overlap at least one of time domain resources or frequency domain resources of the second time-frequency sub-resource.

According to the access method provided in this embodiment of this application, the network control apparatus configures the different time-frequency sub-resources for the terminals with different attributes, so that the terminals with the different attributes perform access on the time-frequency sub-resources corresponding to the attributes to which the terminals belong. This can reduce a probability of a resource conflict generated during access between the terminals with different attributes.

It should be noted that for a method in which the first terminal determines, on the first time-frequency sub-resource, the second time-frequency resource corresponding to the first terminal, refer to the foregoing method for determining, on the first time-frequency resource, the second time-frequency resource corresponding to the first terminal. A difference lies only in that: The resource size of the first time-frequency resource is replaced with a resource size of the first time-frequency sub-resource. To avoid repetition, details are not described herein again.

Optionally, the method may further include: The network control apparatus determines that at least one first target terminal in the at least one terminal successfully performs access.

Optionally, the network control apparatus may determine, in a plurality of manners, that the at least one first target terminal successfully performs access. This is not limited in this embodiment of this application.

In a first possible implementation, the network control apparatus may determine, based on access information of each of the at least one terminal, that the at least one first target terminal successfully performs access.

In other words, the network control apparatus successfully obtains the access information of each of the at least one terminal through parsing.

For example, the at least one terminal includes a terminal 1 and a terminal 2. If the network control apparatus successfully obtains a MAC address 1-abnormal state and a MAC address 2-normal state through parsing, it may be determined that the terminal 2 corresponding to the MAC address 2 successfully performs access.

For another example, the at least one terminal includes a terminal 1 and a terminal 2. If the network control apparatus successfully obtains a MAC address 1-normal state and a MAC address 2-normal state through parsing, it may be determined that the terminal corresponding to the MAC address 1 and the terminal 2 corresponding to the MAC address 2 successfully perform access.

For another example, the at least one terminal includes a terminal 1 and a terminal 2. If the network control apparatus successfully obtains a MAC address 1 and a MAC address 2 through parsing, it may be determined that the terminal corresponding to the MAC address 1 and the terminal 2 corresponding to the MAC address 2 successfully perform access.

For another example, the at least one terminal includes a terminal 1 and a terminal 2. If access information received by the network control apparatus on a resource block 1 indicates the normal state, and access information received on a resource block 2 indicates the normal state, it may be determined that the terminal 1 corresponding to the resource block 1 and the terminal 2 corresponding to the resource block 2 successfully perform access.

In a second possible implementation, the network control apparatus may determine, based on access information of each of the at least one first target terminal, that the at least one first target terminal successfully performs access.

For example, if a terminal 1 and a terminal 2 select a same resource block and send respective access information, the network control apparatus may successfully decode access information from only one terminal, or fail to decode the access information, or obtain no access information. In this way, only a terminal corresponding to the access information successfully decoded by the network control apparatus successfully performs access.

Optionally, the method further includes: The network control apparatus sends indication information to the at least one first target terminal, where the indication information indicates that the at least one first target terminal successfully performs access; and correspondingly, each of the at least one first target terminal receives the indication information from the network control apparatus, and determines, based on the indication information, that access succeeds.

Optionally, the network control apparatus may send the indication information to the at least one first target terminal in a plurality of manners. This is not limited in this embodiment of this application.

In a possible implementation, the network control apparatus may send the indication information to each of the at least one first target terminal.

In another possible implementation, the network control apparatus may send a system broadcast message, where the system broadcast message includes the indication information.

Optionally, the indication information may indicate, in a plurality of manners, that the at least one first target terminal successfully performs access. This is not limited in this embodiment of this application.

In a first possible implementation, the indication information may include third identity information of each of the at least one first target terminal, and the third identity information of each first target terminal indicates the first target terminal.

It should be noted that the third identity information may include at least one of the following items: a device identifier, a MAC address, a soft address, or a short address of the first target terminal.

Optionally, the third identity information of the first target terminal may be the same as or different from the first identity information reported when access is requested. This is not limited in this embodiment of this application.

For example, the at least one terminal includes a terminal 1, a terminal 2, a terminal 3, and a terminal 4. When the indication information includes MAC 1, MAC 2, and MAC 3, it indicates that the terminal 1 corresponding to the MAC 1, the terminal 2 corresponding to the MAC 2, and the terminal 3 corresponding to the MAC 3 successfully perform access.

In a second possible implementation, the indication information may include third identity information of each of at least one second target terminal, the third identity information of each second target terminal indicates the second target terminal, and the at least one second target terminal is a terminal that fails to perform access in the at least one terminal.

For example, the at least one terminal includes a terminal 1, a terminal 2, a terminal 3, and a terminal 4. When the indication information includes MAC 2 and MAC 4, it indicates that the terminal 2 corresponding to the MAC 2 and the terminal 4 corresponding to the MAC 4 fail to perform access, and the terminal 1 corresponding to MAC 1 and the terminal 3 corresponding to MAC 3 successfully perform access.

Optionally, the method further includes: The network control apparatus sends scheduling information to the at least one first target terminal, where the scheduling information indicates a third time-frequency resource used for each of the at least one first target terminal; and correspondingly, each first target terminal receives the scheduling information from the network control apparatus, and transmits data with the network control apparatus on the third time-frequency resource.

Optionally, the network control apparatus may send the scheduling information to the at least one first target terminal in a plurality of manners. This is not limited in this embodiment of this application.

In a first possible implementation, the network control apparatus may send scheduling information of each first target terminal to each first target terminal, where the scheduling information of each first target terminal indicates the third time-frequency resource of each first target terminal.

In a second possible implementation, the network control apparatus may send a system broadcast message, where the system broadcast message includes the scheduling information, and the scheduling information indicates the third time-frequency resource of each first target terminal.

For example, the scheduling information includes a correspondence between identity information of each first target terminal and the third time-frequency resource of each first target terminal.

In a third possible implementation, when a quantity of the at least one target terminal is greater than 1, the network control apparatus may perform group-based scheduling on the at least one target terminal.

It should be noted that, to reduce signaling overheads, the network control may directly send the scheduling information to the at least one target terminal without sending the indication information to the at least one target terminal.

In other words, provided that the scheduling information is received, the first target terminal can determine that the first target terminal successfully performs access.

Optionally, at least one second target terminal that fails to perform access in the at least one terminal on the second time-frequency resource may initiate access to the network control apparatus again.

In a possible implementation, each of the at least one second target terminal may send access information of each second target terminal to the network control apparatus on a fourth time-frequency resource. Correspondingly, the network control apparatus receives the access information from the at least one second target terminal on the fourth time-frequency resource.

Specifically, each second target terminal may send the access information of each second target terminal to the network control apparatus on a fifth time-frequency resource corresponding to each second target terminal, where the fourth time-frequency resource includes the fifth time-frequency resource corresponding to each of the plurality of second target terminals. Correspondingly, the network control apparatus receives the access information from each second target terminal on the fifth time-frequency resource corresponding to each second target terminal.

It should be noted that, for a process in which a second target terminal sends access information of the second target terminal to the network control apparatus on the fifth time-frequency resource corresponding to the second target terminal, refer to the process in which the first terminal sends the access information of the first terminal to the network control apparatus on the second time-frequency resource corresponding to the first terminal. To avoid repetition, details are not described herein again.

Optionally, the first time-frequency resource includes the fourth time-frequency resource, or the fourth time-frequency resource is different from the first time-frequency resource.

In a first possible implementation, the first time-frequency resource may include a second time-frequency resource corresponding to each terminal and the fourth time-frequency resource.

It should be noted that a start moment of the fourth time-frequency resource in time domain is not earlier than an end moment of the second time-frequency resource corresponding to each terminal in time domain.

In a second possible implementation, when at least two terminals in the plurality of terminals have different attributes, the first time-frequency resource may include a time-frequency sub-resource corresponding to a terminal with a different attribute and the fourth time-frequency resource.

It should be noted that a start moment of the fourth time-frequency resource in time domain is not earlier than an end moment of the time-frequency sub-resource corresponding to the terminal with the different attribute in time domain.

In conclusion, the first time-frequency resource may include two phases in time domain. A first phase is used by a plurality of terminals to perform group access or batch access, and a second phase is used by a terminal that fails to perform access in the first phase to perform access again.

In a third possible implementation, the fourth time-frequency resource is a time-frequency resource other than the first time-frequency resource.

It should be noted that a start moment of the fourth time-frequency resource in time domain is not earlier than an end moment of the first time-frequency resource in time domain.

In conclusion, the first time-frequency resource is used by the plurality of terminals to perform group access or batch access, and the fourth time-frequency resource is used by the terminal that fails to perform access on the first time-frequency resource to perform access again.

Optionally, the second target terminal may determine the fourth time-frequency resource in a plurality of manners. This is not limited in this embodiment of this application.

In a possible implementation, the resource configuration information is further used to configure the fourth time-frequency resource used by the at least one second target terminal to perform access again.

In another possible implementation, the network control apparatus may send fourth access configuration information to the at least one second target terminal, where the fourth access configuration information indicates the fourth time-frequency resource.

The access method 200 provided in embodiments of this application is described above with reference to FIG. 3. An access apparatus and an access control apparatus that are configured to perform the method 200 are described below with reference to FIG. 4 to FIG. 6.

It should be noted that the access apparatus may be the terminal in the embodiment of the method 200, and can perform the method implemented by the terminal in the method 200. The access control apparatus may be the network control apparatus in the embodiment of the method 200, and can perform the method implemented by the network control apparatus in the method 200.

It may be understood that, to implement the foregoing functions, the access apparatus or the access control apparatus includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the access apparatus and the access control apparatus may be divided into function modules based on the examples in the foregoing method. For example, each function module corresponding to each function may be obtained through division, or two or more functions may be integrated into one processing module. The integrated module may be implemented in a form of hardware. It should be noted that, in embodiments, module division is an example, is merely logical function division, and may be other division during actual implementation.

Figure 4:
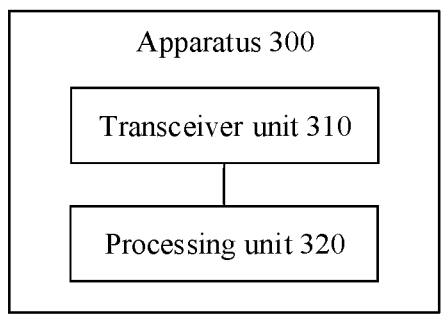
FIG. 4 is a schematic block diagram of an apparatus 300 according to an embodiment of this application.

When each function module is obtained through division based on each corresponding function, FIG. 4 is a schematic diagram of a possible composition of the access apparatus (for example, a terminal) or the access control apparatus (for example, a network control apparatus) in the foregoing embodiments. As shown in FIG. 4, the apparatus 300 may include a transceiver unit 310 and a processing unit 320.

The processing unit 320 may control the transceiver unit 310 to implement the method performed by the network control apparatus or the terminal in the embodiment of the method 200, and/or another process of the technology described in this specification.

It should be noted that all related content of the steps in the foregoing method embodiments may be cited in function description of corresponding functional modules. Details are not described herein again.

When an integrated unit is used, the apparatus 300 may include a processing unit, a storage unit, and a communication unit. The processing unit may be configured to control and manage an action of the apparatus 300, for example, may be configured to support the apparatus 300 in performing steps performed by the foregoing units. The storage unit may be configured to support the apparatus 300 in storing program code, data, and the like. The communication unit may be configured to support communication between the apparatus 300 and another device.

The processing unit may be a processor or a controller. The processor may implement or execute various example logical blocks, modules, and circuits described with reference to content disclosed in this application. The processor may alternatively be a combination, for example, a combination including one or more microprocessors or a combination of digital signal processor (digital signal processing, DSP) and a microprocessor, for implementing a computing function. The storage unit may be a memory. The communication unit may be specifically a device that communicates with another electronic device, for example, a radio frequency circuit, a Bluetooth chip, and a Wi-Fi chip.

Figure 5:
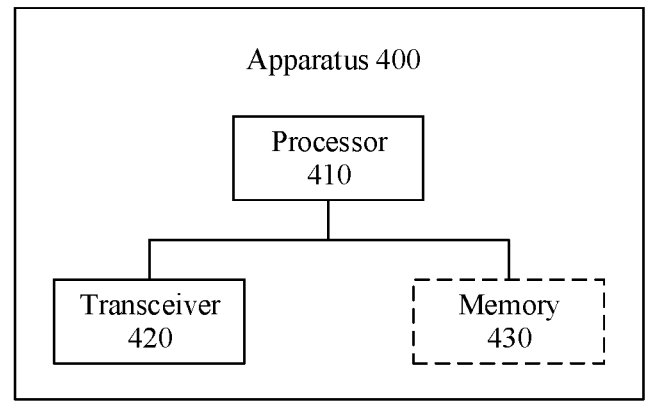
FIG. 5 is a schematic block diagram of an apparatus 400 according to an embodiment of this application.

In a possible implementation, the access apparatus or the access control apparatus in this embodiment may be an apparatus 400 in a structure shown in FIG. 5. The apparatus 400 may be a schematic diagram of a structure of a terminal, or may be a schematic diagram of a structure of a network control apparatus. The apparatus 400 includes a processor 410 and a transceiver 420, and the processor 410 and the transceiver 420 communicate with each other through an internal connection path. A related function implemented by the processing unit 320 in FIG. 4 may be implemented by the processor 410. A related function implemented by the transceiver unit 310 may be implemented by the processor 410 by controlling the transceiver 420.

Optionally, the apparatus 400 may further include a memory 430. The processor 410, the transceiver 420, and the memory 430 communicate with each another through an internal connection path. A related function implemented by the storage unit in FIG. 4 may be implemented by the memory 430.

In a possible implementation, when the apparatus 300 or the apparatus 400 is deployed (or integrated) in a terminal, the apparatus 300 or the apparatus 400 in embodiments of this application may be the terminal.

Figure 6:
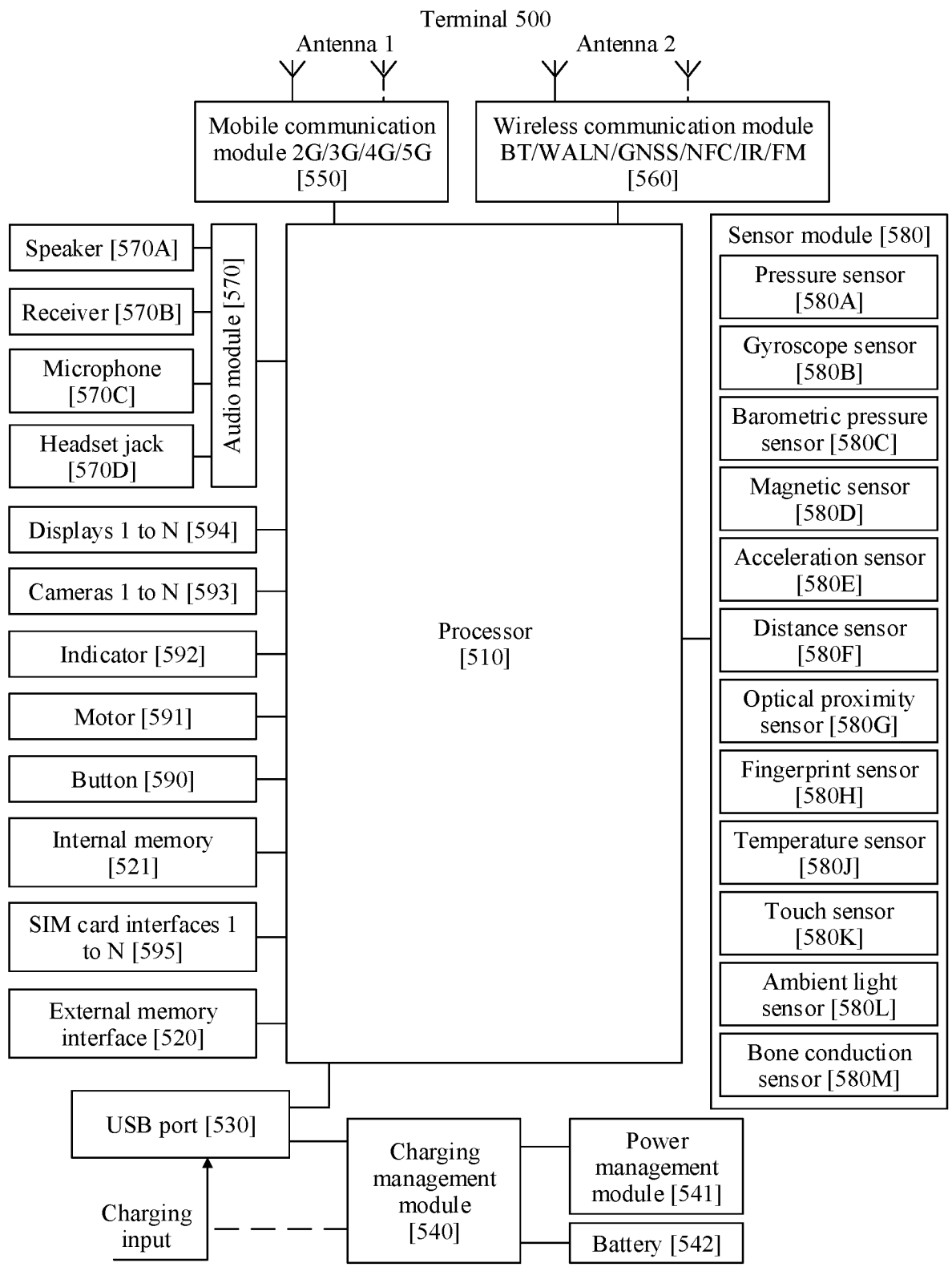
FIG. 6 is a schematic block diagram of a terminal 500 according to an embodiment of this application.
Figure 7:
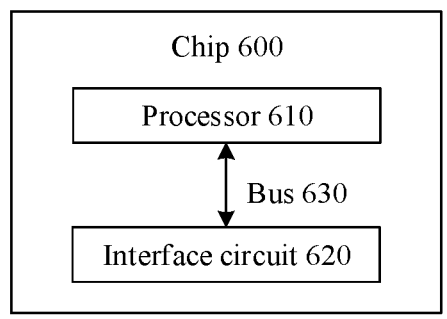
FIG. 7 is a schematic block diagram of a chip 600 according to an embodiment of this application.

FIG. 6 is a schematic diagram of a structure of a terminal 500. The terminal 500 may be shown in FIG. 6, and the terminal 500 may include a processor 510, an external memory interface 520, an internal memory 521, a universal serial bus (universal serial bus, USB) port 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, a button 590, a motor 591, an indicator 592, a camera 593, a display 594, a subscriber identification module (subscriber identification module, SIM) card interface 595, and the like.

It may be understood that the structure shown in this embodiment of this application does not constitute a specific limitation on the terminal 500. In some other embodiments of this application, the terminal 500 may include more or fewer components than those shown in the figure, or some components may be combined, or some components may be split, or there may be a different component layout. The components shown in the figure may be implemented by using hardware, software, or a combination of software and hardware.

The processor 510 may include one or more processing units. For example, the processor 510 may include an application processor (application processor, AP), a modem processor, a graphics processing unit (graphics processing unit, GPU), an image signal processor (image signal processor, ISP), a controller, a video codec, a digital signal processor (digital signal processor, DSP), an application-specific integrated circuit (application-specific integrated circuit, ASIC), a field-programmable gate array (field-programmable gate array, FPGA), a baseband processor, a neural-network processing unit (neural-network processing unit, NPU), and/or the like. Different processing units may be independent components, or may be integrated into one or more processors. In some embodiments, the terminal 500 may alternatively include one or more processors 510. The controller may generate an operation control signal based on instruction operation code and a time sequence signal, to complete control of instruction reading and instruction execution. In some other embodiments, a memory may be disposed in the processor 510, to store instructions and data. For example, the memory in the processor 510 may be a cache. The memory may store instructions or data just used or cyclically used by the processor 510. If the processor 510 needs to use the instructions or the data again, the processor 510 may directly invoke the instructions or the data from the memory. In this way, repeated access is avoided, waiting time of the processor 510 is reduced, and efficiency of processing data or executing instructions by the terminal 500 is improved.

In some embodiments, the processor 510 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB port, and/or the like. The USB port 530 is a port that conforms to a USB standard specification, and may be specifically a mini USB port, a micro USB port, a USB type-C port, or the like. The USB port 530 may be used to connect to a charger to charge the terminal 500, or may be configured to transmit data between the terminal 500 and a peripheral device. The USB port 530 may alternatively be used to connect to a headset, and play audio by using the headset.

It may be understood that an interface connection relationship between the modules in this embodiment of this application is merely an example for description, and does not constitute a limitation on the structure of the terminal 500. In some other embodiments of this application, the terminal 500 may alternatively use an interface connection manner different from that in the foregoing embodiment, or may use a combination of a plurality of interface connection manners.

The charging management module 540 is configured to receive a charging input from a charger. The charger may be a wireless charger or a wired charger. In some embodiments of wired charging, the charging management module 540 may receive a charging input of a wired charger through the USB port 530. In some embodiments of wireless charging, the charging management module 540 may receive a wireless charging input through a wireless charging coil of the terminal 500. The charging management module 540 may further supply power to the terminal by using the power management module 541 while charging the battery 542.

The power management module 541 is configured to connect to the battery 542, the charging management module 540, and the processor 510. The power management module 541 receives an input of the battery 542 and/or the charging management module 540, and supplies power to the processor 510, the internal memory 521, an external memory, the display 594, the camera 593, the wireless communication module 560, and the like. The power management module 541 may be configured to monitor parameters such as a battery capacity, a battery cycle count, and a battery health status (electric leakage or impedance). In some other embodiments, the power management module 541 may alternatively be disposed in the processor 510. In some other embodiments, the power management module 541 and the charging management module 540 may alternatively be disposed in a same device.

A wireless communication function of the terminal 500 may be implemented through the antenna 1, the antenna 2, the mobile communication module 550, the wireless communication module 560, the modem processor, the baseband processor, and the like.

The antenna 1 and the antenna 2 are configured to transmit and receive an electromagnetic wave signal. Each antenna in the terminal 500 may be configured to cover one or more communication frequency bands. Different antennas may further be multiplexed, to improve antenna utilization. For example, the antenna 1 may be multiplexed as a diversity antenna of a wireless local area network. In other embodiments, the antenna may be used in combination with a tuning switch.

The mobile communication module 550 may provide a solution that is applied to the terminal 500 and that includes wireless communication such as 2G, 3G, 4G, 5G, and the like. The mobile communication module 550 may include at least one filter, a switch, a power amplifier, a low noise amplifier (low noise amplifier, LNA), and the like. The mobile communication module 550 may receive an electromagnetic wave through the antenna 1, perform processing such as filtering or amplification on the received electromagnetic wave, and transmit a processed electromagnetic wave to the modem processor for demodulation. The mobile communication module 550 may further amplify a signal modulated by the modem processor, and convert an amplified signal into an electromagnetic wave through the antenna 1 for radiation. In some embodiments, at least some function modules in the mobile communication module 550 may be disposed in the processor 510. In some embodiments, at least some function modules in the mobile communication module 550 and at least some modules in the processor 510 may be disposed in a same device.

The wireless communication module 560 may provide a solution for wireless communication that is applied to the terminal 500 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, another possible general-purpose transmission technology, or the like.

Optionally, the wireless communication module 560 may be one or more components integrating at least one communication processing module. One communication processing module may correspond to one network interface. The network interface may be disposed in different service function modes. Network interfaces disposed in different modes may establish network connections corresponding to the modes.

For example, a network connection supporting a P2P function may be established by using a network interface in a P2P function mode. A network connection supporting a STA function may be established by using a network interface in a STA function mode. A network connection supporting an AP function may be established by using a network interface in an AP mode.

The wireless communication module 560 receives an electromagnetic wave through the antenna 2, performs frequency modulation and filtering processing on an electromagnetic wave signal, and sends a processed signal to the processor 510. The wireless communication module 560 may further receive a to-be-sent signal from the processor 510, perform frequency modulation and amplification on the signal, and convert a processed signal into an electromagnetic wave for radiation through the antenna 2.

The terminal 500 implements a display function by using the GPU, the display 594, the application processor, and the like. The GPU is a microprocessor for image processing, and is connected to the display 594 and the application processor. The GPU is configured to perform mathematical and geometric computation, and render an image. The processor 510 may include one or more GPUs that execute program instructions to generate or change display information.

The display 594 is configured to display an image, a video, or the like. The display 594 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light emitting diode, QLED), and the like. In some embodiments, the terminal 500 may include one or more displays 594.

In some embodiments of this application, when the display panel is made of a material such as an OLED, an AMOLED, or an FLED, the display 594 in FIG. 6 may be folded. Herein, that the display 594 may be folded means that the display may be folded to any angle at any part and may be maintained at the angle. For example, the display 594 may be folded left and right in the middle, or may be folded up and down in the middle. In this application, the display that can be folded is referred to as a foldable display. The touch display may be a screen, or may be a display formed by combining a plurality of screens. This is not limited herein.

The display 594 of the terminal 500 may be a flexible display. Currently, the flexible display attracts much attention because of unique features and huge potential of the flexible display. Compared with a conventional display, the flexible display has features of strong flexibility and bendability, and can provide a user with a new bendability-based interaction mode, to satisfy more requirements of the user on a terminal. For a terminal equipped with a foldable display, the foldable display of the terminal may be switched between a small display in a folded form and a large display in an unfolded form at any time. Therefore, the user uses a multi-screen display function more frequently on the terminal equipped with the foldable display.

The terminal 500 may implement a photographing function through the ISP, the camera 593, the video codec, the GPU, the display 594, the application processor, and the like.

The ISP is configured to process data fed back by the camera 593. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 593.

The camera 593 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 500 may include one or more cameras 593.

The digital signal processor is configured to process a digital signal, and may process another digital signal in addition to the digital image signal. For example, when the terminal 500 selects a frequency, the digital signal processor is configured to perform Fourier transform and the like on frequency energy.

The video codec is configured to compress or decompress a digital video. The terminal 500 may support one or more video codecs. In this way, the terminal 500 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information based on a structure of a biological neural network, for example, a transfer service function between human brain neurons, and may further continuously perform self-learning. The NPU can implement applications such as intelligent cognition of the terminal 500, for example, image recognition, facial recognition, speech recognition, and text understanding.

The external memory interface 520 may be used to connect to an external storage card, for example, a micro SD card, to extend a storage capability of the terminal 500. The external storage card communicates with the processor 510 through the external memory interface 520, to implement a data storage function. For example, files such as music and videos are stored in the external storage card.

The internal memory 521 may be configured to store one or more computer programs. The one or more computer programs include instructions. The processor 510 may run the instructions stored in the internal memory 521, so that the terminal 500 performs a screen-off display method provided in some embodiments of this application, various applications, data processing, and the like. The internal memory 521 may include a program storage area and a data storage area. The program storage area may store an operating system. The program storage area may further store one or more applications (such as gallery and contacts), and the like. The data storage area may store data (for example, photos and contacts) created during use of the terminal 500, and the like. In addition, the internal memory 521 may include a high-speed random access memory, or may include a non-volatile memory, for example, one or more magnetic disk storage devices, a flash memory device, or a universal flash storage (universal flash storage, UFS). In some embodiments, the processor 510 may run the instructions stored in the internal memory 521 and/or the instructions stored in the memory that is disposed in the processor 510, so that the terminal 500 performs the screen-off display method provided in embodiments of this application, other applications, and data processing. The terminal 500 may implement an audio function, for example, music playing and recording, through the audio module 570, the speaker 570A, the receiver 570B, the microphone 570C, the headset jack 570D, the application processor, and the like.

The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, a bone conduction sensor 580M, and the like.

An embodiment further provides a computer storage medium. The computer storage medium stores computer instructions. When the computer instructions are run on an electronic device, the electronic device is enabled to perform the related method steps, to implement the access method in the foregoing embodiments.

An embodiment further provides a computer program product. When the computer program product runs on a computer, the computer is enabled to perform the related steps, to implement the access method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the access method in the foregoing method embodiments.

FIG. 6 is a schematic diagram of a structure of a chip 600. The chip 600 includes one or more processors 610 and an interface circuit 620. Optionally, the chip 600 may further include a bus 630.

The processor 610 may be an integrated circuit chip, and has a signal processing capability. In an implementation process, the steps in the foregoing method may be completed by using an integrated logic circuit of hardware in the processor 610 or instructions in a form of software. The foregoing processor 610 may be a general-purpose processor, a DSP, an ASIC, an FPGA or another programmable logic device, a discrete gate or transistor logic device, or a discrete hardware component. The processor may implement or perform the methods and steps that are disclosed in embodiments of this application. The general-purpose processor may be a microprocessor, or the processor may be any conventional processor or the like.

The interface circuit 620 may be used to send or receive data, instructions, or information. The processor 610 may process data, instructions, or other information received through the interface circuit 620, and send, through the interface circuit 620, information obtained after processing.

Optionally, the chip further includes a memory. The memory may include a read-only memory and a random access memory, and provide operation instructions and data for the processor. A part of the memory may further include a non-volatile random access memory (non-volatile random access memory, NVRAM).

Optionally, the memory stores an executable software module or a data structure, and the processor may perform a corresponding operation by invoking operation instructions (the operation instructions may be stored in an operating system) stored in the memory.

Optionally, the chip may be used in the access apparatus or the access control apparatus in embodiments of this application. Optionally, the interface circuit 620 may be used to output an execution result of the processor 610. For the access method provided in one or more embodiments of this application, refer to the foregoing embodiments. Details are not described herein again.

It should be noted that functions corresponding to each of the processor 610 and the interface circuit 620 may be implemented by using a hardware design, may be implemented by using a software design, or may be implemented by combining software and hardware. This is not limited herein.

The network control apparatus, the terminal, the computer storage medium, the computer program product, or the chip provided in embodiments is configured to perform the corresponding method provided above. Therefore, for beneficial effects that can be achieved, refer to the beneficial effects in the corresponding method provided above. Details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An access control method, wherein the method comprises:
 sending resource configuration information, wherein the resource configuration information configures a first time-frequency resource used for access of a plurality of terminals; and
 receiving access information from at least one of the plurality of terminals on the first time-frequency resource, wherein the access information of the terminal comprises at least one of first identity information or status information of the terminal, the first identity information identifies the terminal, and the status information indicates a status of the terminal, wherein the receiving access information from at least one of the plurality of terminals on the first time-frequency resource comprises:
  receiving access information from each of the at least one of the plurality of terminals on a second time-frequency resource corresponding to the respective terminal, wherein the second time-frequency resource corresponding to each of the at least one of the plurality of terminals belongs to the first time-frequency resource, wherein the second time-frequency resource corresponding to the terminal is indicated by second identity information of the terminal.

2. The method according to claim 1, wherein second time-frequency resources corresponding to the plurality of terminals are orthogonal to each other.

3. The method according to claim 1, wherein the first identity information or the second identity information comprises at least one of the following items:
 a device identifier, a media access control (MAC) address, a soft address, or a short address of the terminal.

4. The method according to claim 3, wherein the soft address identifies the terminal in a communication domain in which the terminal is located.

5. The method according to claim 3, wherein the soft address is an address allocated during last access of the terminal.

6. The method according to claim 1, wherein the second identity information is a soft address of the terminal.

7. The method according to claim 1, wherein the first identity information is same with the second identity information.

8. The method according to claim 1, wherein an index of the second time-frequency resource corresponding to the terminal is obtained by performing a modulo operation on the second identity information and a quantity of pieces of access information reported on the first time-frequency resource.

9. An access method, comprising:
 receiving resource configuration information from a network control apparatus, wherein the resource configuration information configures a first time-frequency resource for access of a plurality of terminals, and the plurality of terminals comprise a first terminal; and
 sending access information to the network control apparatus on a second time-frequency resource corresponding to the first terminal, wherein the access information comprises at least one of first identity information or status information, the first identity information identifies the first terminal, the status information indicates a status of the first terminal, and the second time-frequency resource corresponding to the first terminal belongs to the first time-frequency resource, wherein the second time-frequency resource corresponding to the first terminal is determined by second identity information of the first terminal.

10. The method according to claim 9, wherein second time-frequency resources corresponding to the plurality of terminals are orthogonal to each other.

11. The method according to claim 9, wherein the first identity information or the second identity information comprises at least one of the following items:
 a device identifier, a media access control (MAC) address, a soft address, and a short address.

12. The method according to claim 11, wherein the soft address identifies the terminal in a communication domain in which the terminal is located.

13. The method according to claim 9, wherein the second identity information is a soft address of the terminal.

14. The method according to claim 9, wherein an index of the second time-frequency resource corresponding to the terminal is obtained by performing a modulo operation on the second identity information and a quantity of pieces of access information that can be reported on the first time-frequency resource.

15. An apparatus, comprising:
 one or more processors, and a non-transitory storage medium in communication with the one or more processors, wherein the non-transitory storage medium stores program instructions that, when executed by the one or more processors, cause the apparatus to:

send resource configuration information, wherein the resource configuration information configures a first time-frequency resource used for access of a plurality of terminals; and receive access information from at least one of the plurality of terminals on the first time-frequency resource, wherein the access information of the terminal comprises at least one of first identity information or status information of the terminal, the first identity information identifies the terminal, and the status information indicates a status of the terminal, wherein the receiving access information from at least one of the plurality of terminals on the first time-frequency resource comprises:

receiving access information from each of the at least one of the plurality of terminals on a second time-frequency resource corresponding to the respective terminal, wherein the second time-frequency resource corresponding to each of the at least one of the plurality of terminals belongs to the first time-frequency resource, wherein the second time-frequency resource corresponding to the terminal is indicated by second identity information of the terminal.

16. The apparatus according to claim 15, wherein second time-frequency resources corresponding to the plurality of terminals are orthogonal to each other.

17. The apparatus according to claim 15, wherein the first identity information or the second identity information comprises at least one of the following items:

a device identifier, a media access control (MAC) address, a soft address, or a short address of the terminal.

18. The apparatus according to claim 17, wherein the soft address identifies the terminal in a communication domain in which the terminal is located.

19. The apparatus according to claim 17, wherein the soft address is an address allocated during last access of the terminal.

20. The apparatus according to claim 15, wherein the second identity information is a soft address of the terminal.

* * * * *